United States Patent [19]

Barr

[11] Patent Number: 4,979,150

[45] Date of Patent: Dec. 18, 1990

[54] SYSTEM FOR ATTENUATION OF WATER-COLUMN REVERBERATIONS

[75] Inventor: Frederick J. Barr, Houston, Tex.

[73] Assignee: Halliburton Geophysical Services, Inc., Houston, Tex.

[21] Appl. No.: 398,809

[22] Filed: Aug. 25, 1989

[51] Int. Cl.$^5$ .............................................. G01V 1/38
[52] U.S. Cl. ........................................ 367/24; 367/57
[58] Field of Search ................... 367/24, 21, 57, 46

[56] References Cited

U.S. PATENT DOCUMENTS

| | | | |
|---|---|---|---|
| H387 | 12/1987 | Kruka et al. | 367/154 |
| Re. 23,552 | 9/1952 | Babb et al. | 177/352 |
| 1,584,613 | 5/1926 | Comstock et al. | 367/130 |
| 2,627,930 | 2/1953 | Woods | 181/5 |
| 2,740,945 | 4/1956 | Howes | 367/25 |
| 2,753,948 | 7/1956 | Ongaro | 181/33 |
| 2,757,356 | 7/1956 | Haggerty | 367/24 |
| 2,791,757 | 5/1957 | Blake et al. | 367/173 |
| 2,807,793 | 9/1957 | Bavhi | 367/185 |
| 2,856,594 | 10/1958 | McLoad | 367/154 |
| 2,882,988 | 4/1959 | Dobrin | 181/5 |
| 2,906,992 | 9/1959 | Wilcoxon | 367/173 |
| 2,923,367 | 2/1960 | Cox | 181/0.5 |
| 3,054,085 | 9/1962 | Alexander | 367/177 |
| 3,274,542 | 9/1966 | Ruehle | 367/46 |
| 3,281,768 | 10/1966 | Pavey, Jr. et al. | 367/21 |
| 3,286,227 | 11/1966 | Aldrich | 367/154 |
| 3,290,645 | 12/1966 | Pavey, Jr. et al. | 367/24 |
| 3,299,397 | 1/1967 | Pavey, Jr. et al. | 367/24 |
| 3,304,364 | 2/1967 | Hetherington | 174/101 |
| 3,319,734 | 5/1967 | Pavey, Jr. | 181/0.5 |
| 3,343,626 | 9/1967 | Sparks | 181/0.5 |
| 3,350,683 | 10/1967 | Sengbush | 367/16 |
| 3,354,860 | 11/1967 | Dale et al. | 114/235 |
| 3,354,984 | 11/1967 | Pavey, Jr. | 181/0.5 |
| 3,369,216 | 2/1968 | Loper | 367/16 |
| 3,371,311 | 2/1968 | Cholet et al. | 367/154 |
| 3,409,871 | 11/1968 | Heffring | 367/51 |
| 3,441,902 | 4/1969 | Savit | 367/84 |
| 3,491,848 | 1/1970 | Giles | 181/0 |
| 3,518,677 | 6/1970 | Florian | 367/154 |
| 3,696,329 | 10/1972 | Hazelhurst | 367/154 |
| 3,710,006 | 1/1973 | Davis | 174/101 |
| 3,739,328 | 6/1973 | Beil | 367/25 |
| 3,860,899 | 1/1975 | Watlington | 367/131 |
| 3,863,201 | 1/1975 | Briggs et al. | 367/65 |
| 3,866,161 | 2/1975 | Barr, Jr. et al. | 367/56 |
| 3,893,065 | 7/1975 | Lea et al. | 367/152 |

(List continued on next page.)

FOREIGN PATENT DOCUMENTS 1316479 11/1970 United Kingdom.
2004648 4/1979 United Kingdom.
2030400 4/1980 United Kingdom.

OTHER PUBLICATIONS

Gal'perin, "Vertical Seismic Profiling," published by Society of Exploration Geophysicists, Pubn. No. 12, pp. 96-99.

(List continued on next page.)

Primary Examiner—Ian J. Lobo
Attorney, Agent, or Firm—David J. Powsner

[57] ABSTRACT

A marine seismic reflection prospecting system reduces coherent noise by applying a scale factor to the output of a pressure transducer and a particle velocity transducer positioned substantially adjacent one another in the water. The transducers can be positioned at a point in the water above the bottom and, thereby, eliminate downgoing components of reverberation, or they can be positioned on the water's bottom and, thereby, eliminate both upgoing and downgoing components of the reverberation. The scale factor, which derives from the acoustical impedance of the water or water-bottom material, can be determined both deterministically and statistically. The former involves measuring and comparing the responses of the pressure and velocity transducers to a pressure wave induced in the water. The latter involves comparing the magnitude of the pressure signal autocorrelation to the pressure and velocity signal crosscorrelation at selected lag values or, alternatively, comparing the magnitude of the pressure signal autocorrelation to the velocity signal autocorrelation at selected lag values.

40 Claims, 10 Drawing Sheets

U.S. PATENT DOCUMENTS

| | | | |
|---|---|---|---|
| 3,930,254 | 12/1975 | Pavey, Jr. | 367/172 |
| 3,932,835 | 1/1976 | Abbott | 367/172 |
| 3,943,484 | 3/1976 | Balderson | 367/24 |
| 3,964,424 | 6/1976 | Hagemann | 114/235 |
| 3,979,713 | 9/1976 | Parrack | 367/20 |
| 3,990,039 | 11/1976 | Miller | 367/179 |
| 4,038,630 | 7/1977 | Chelminski | 367/23 |
| 4,078,223 | 3/1978 | Strange | 367/58 |
| 4,090,168 | 5/1978 | Miller et al. | 367/131 |
| 4,117,447 | 9/1978 | Gould et al. | 367/106 |
| 4,134,097 | 1/1979 | Cowles | 367/13 |
| 4,146,871 | 3/1979 | Ruehle | 367/24 |
| 4,160,229 | 7/1979 | McGough | 367/154 |
| 4,210,897 | 7/1980 | Hutchins | 367/106 |
| 4,276,620 | 6/1981 | Kahn et al. | 367/60 |
| 4,296,481 | 10/1981 | Weiss | 367/20 |
| 4,317,185 | 2/1982 | Thigpen et al. | 367/15 |
| 4,345,473 | 8/1982 | Berni | 73/516 |
| 4,348,749 | 9/1982 | Galbraith, Jr. | 367/46 |
| 4,353,121 | 10/1982 | Ray et al. | 367/21 |
| 4,380,059 | 4/1983 | Ruehle | 367/46 |
| 4,402,069 | 8/1983 | Miller et al. | 367/154 |
| 4,415,997 | 11/1983 | Wilson | 367/15 |
| 4,437,175 | 3/1984 | Berni | 367/24 |
| 4,439,497 | 3/1984 | DiFoggio | 428/539 |
| 4,449,208 | 5/1984 | Moeckel et al. | 367/30 |
| 4,477,887 | 10/1984 | Berni | 367/24 |
| 4,486,865 | 12/1984 | Ruehle | 367/24 |
| 4,510,588 | 4/1985 | Kruka et al. | 367/165 |
| 4,520,467 | 5/1985 | Berni | 367/24 |
| 4,581,724 | 4/1986 | Zachariadis | 367/21 |
| 4,633,449 | 12/1986 | Ingram et al. | 367/75 |
| 4,644,507 | 2/1987 | Ziolkowski | 367/23 |
| 4,644,508 | 2/1987 | Zachariadis | 367/24 |
| 4,660,183 | 4/1987 | McGowan et al. | 367/15 |
| 4,679,179 | 7/1987 | Lally | 367/162 |
| 4,685,090 | 8/1987 | Krevor | 367/20 |
| 4,733,378 | 3/1988 | Pearce et al. | 367/17 |
| 4,733,379 | 3/1988 | Lapetina et al. | 367/20 |
| 4,734,891 | 3/1988 | McGowan et al. | 367/15 |
| 4,736,345 | 4/1988 | Keckler et al. | 367/20 |
| 4,752,916 | 6/1988 | Loewenthal | 367/24 |
| 4,765,436 | 8/1988 | Dowell | 181/207 |
| 4,794,573 | 12/1988 | Bell et al. | 367/57 |
| 4,809,243 | 2/1989 | Bledsoe et al. | 367/154 |
| 4,813,028 | 3/1989 | Liu | 367/31 |
| 4,821,241 | 4/1989 | Berglund | 367/20 |
| 4,837,751 | 6/1989 | Kruka et al. | 367/154 |

OTHER PUBLICATIONS

Treitel et al, "Plane-wave Decomposition of Seismograms," Geophysics, vol. 47, no. 10, Oct. 1982, pp. 1375–1401.

White, "Chapter 2—Plane Waves," Seismic Wave Radiation–Transmission and Attenuation, McGraw Hill, 1965, pp. 15–41.

Ziolkowski et al, "Wavelet Deconvolution Using a Source Scaling Law," Geophysical Prospecting, vol. 28, 1980, pp. 872–901.

Ziolkowski, "Source Array Scaling for Wavelet Deconvolution," Geophysical Prospecting, vol. 28, 1980, pp. 902–918.

Loewenthal et al, "Source Signature Estimation Using Fictitious Source and Reflector," Geophysics, vol. 54, no. 7, Jul. 1989, pp. 916–920.

Bell et al, "Two-Trace Directional Filter for Processing . . . " published by Society of Exploration Geophysicists, 1987 ann. conf., pp. 768–769.

Brink, "Application of Vertical Receiver Arrays in 3-D . . . " published by Society of Exploration Geophysicists, 1988 ann. conf., pp. 460–463.

Brink, "Marine Seismic Exploration Using Vertical Receiver Arrays: . . . " 49th Mtg. of European Assn. of Exploration Geophysicists, Jun. 1987.

Cagniard, "Basic Theory of the Magneto-Telluric Method of Geophysical Prospecting," pp. 605–635.

Loewenthal, "Patents," Geophysics, vol. 53, Dec. 1988, p. 1627.

Monk, "Wavefield Separation of Twin Streamer Data," presented at 51st Ann. Mtg. of the European Assn. of Exploration Geophysicists, Jun. 1989.

|  | NORMAL | HARD | SOFT | WATER |
|---|---|---|---|---|
| density ($\rho$) | $1.7$ g/cm$^3$ | $3.0$ g/cm$^3$ | $1.2$ g/cm$^3$ | $1.0$ g/cm$^3$ |
| p-wave velocity ($\alpha$) | $1700$ m/s | $4500$ m/s | $1200$ m/s | $1500$ m/s |
| s-wave velocity ($\beta$) | $600$ m/s | $2500$ m/s | $360$ m/s | $0$ m/s |
| Poisson's ratio ($\sigma$) | $.43$ | $.28$ | $.45$ | $.50$ |
| Lame parameter ($\lambda$) | $3.69 \times 10^9$ | $23.2 \times 10^9$ | $1.42 \times 10^9$ | $2.25 \times 10^9$ |
| Lame parameter ($\mu$) | $.612 \times 10^9$ | $18.8 \times 10^9$ | $.156 \times 10^9$ | $0$ |
| Young's modulus ($Y$) | $1.75 \times 10^9$ | $48.0 \times 10^9$ | $.453 \times 10^9$ | $0$ |
| bulk modulus ($K$) | $4.10 \times 10^9$ | $35.7 \times 10^9$ | $1.52 \times 10^9$ | $2.25 \times 10^9$ |

FIGURE 13

SYSTEM FOR ATTENUATION OF WATER-COLUMN REVERBERATIONS

BACKGROUND OF THE INVENTION

This invention relates to marine seismic surveying and, more particularly, to systems for enhancing marine seismic profiles to minimize destructive effects of water column reverberation.

Generally speaking, marine seismic surveys are conducted by towing an energy source and seismic detectors behind a vessel. The source imparts an acoustic wave to the water, creating a wavefield which travels coherently into the underlying earth. As the wavefield strikes interfaces between earth formations, or strata, it is reflected back through the earth and water to the detectors, where it is converted to electrical signals and recorded. Through analysis of these signals, it is possible to determine the shape, position and lithology of the sub-bottom formations.

A problem encountered in marine surveying—as well as in inverse vertical seismic profiling, or "VSP"—is that of water column reverberation. The problem, which arises as a result of the inherent reflectivity of the water surface and bottom, may be explained as follows.

A seismic wave generated in (or reflected off) earth strata passes into the water in a generally upward direction. This wave, termed the "primary," travels through the water and past the seismic detector which records its presence. The wavefield continues upward to the water's surface, where it is reflected back downwards. This reflected, or "ghost," wavefield also travels through the water and past the detector, where it is again recorded. Depending upon the nature of the earth material at the water's bottom, the ghost wavefield may itself be reflected upwards through the water, giving rise to a series of one or more subsequent ghost reflections.

This reverberation of the seismic wavefield in the water obscures seismic data, amplifying certain frequencies and attenuating others, thereby making it difficult to analyze the underlying earth formations.

In instances where the earth material at the water bottom is particularly hard, excess acoustic energy or noise generated by the seismic source can also become trapped in the water column, reverberating in the same manner as the reflected seismic waves themselves. This noise is often high in amplitude and, as a result, tends to cover the weaker seismic reflection signals sought for study.

In the art, Ruehle, U.S. Pat. No. 4,486,865, discloses a technique for reducing ghosting wherein a pressure detector and a particle velocity detector are positioned in close proximity to one another in the water. The output of at least one of the detectors is gain-adjusted and filtered, using a deconvolution operation having a predetermined amount of white noise to the zero lag of the autocorrelation function. The patent suggests that, by adding this deconvolved/gain-adjusted signal to the output of the other detector, ghost reflections may be cancelled.

Haggerty, U.S. Pat. No. 2,757,356, discloses a marine seismic reflection surveying system in which two seismometer spreads are disposed at two distinct depths in the water such that water column reverberations received by them are 180 degrees out of phase. By combining the output of the detectors, the patent suggests that the reverberations will cancel.

Berni, U.S. Pat. No. 4,345,473, suggests the use of a vertical component accelerometer in combination with a hydrophone for cancelling surface-reflected noise in marine seismic operations.

Gal'perin, "Vertical Seismic Profiling," Special Publication No. 12 of the Society of Exploration Geophysicists, suggests the use of a seismic detector which combines the output of a pressure and velocity sensor for use in VSP surveying.

While the aforementioned prior art techniques may be effective under certain circumstances, none is considered adequate for use in water-bottom cable surveying in deep water operations, i.e., surveys in depths greater than 50–100 feet. Moreover, techniques of the type proposed in the Ruehle patent suffer losses in signal quality inherent to the filtering process, for example, amplification of noise in certain frequencies.

Accordingly, an object of this invention is to provide an improved system for marine seismic reflection prospecting.

More particularly, an object of the invention is to provide methods for marine seismic prospecting capable of attenuating coherent noise resulting, for example, from water column reverberation.

A further object of the invention is to provide a marine seismic reflection prospecting system effective in all depths of water, including that greater than 50–100 feet.

SUMMARY OF THE INVENTION

The above objects are attained by the invention, providing a marine seismic reflection prospecting system that reduces coherent noise by applying a scale factor to the output of a pressure transducer and a particle velocity transducer positioned substantially adjacent one another in the water. The transducers can be positioned at a point in the water above the bottom and, thereby, eliminate downgoing components of reverberation, or they can be positioned on the water's bottom and, thereby, eliminate both upgoing and downgoing components of the reverberation.

The scale factor, which derives from the acoustical impedance of the water or water-bottom material, can be determined both deterministically and statistically. The former involves measuring and comparing the responses of the pressure and velocity transducers to a pressure wave induced in the water. The latter involves comparing the magnitude of the pressure signal autocorrelation to the pressure and velocity signal crosscorrelation at selected lag values or, alternatively, comparing the magnitude of the pressure signal autocorrelation to the velocity signal autocorrelation at selected lag values.

More particularly, in one aspect, the invention provides a method for seismic reflection prospecting in water covered areas, including the steps of: generating a seismic wave for reflection from earth strata; detecting water pressure and particle velocity at a first position in the water resulting from that seismic wave and generating a signal representative thereof; and generating an enhanced seismic reflection signal as a selected linear combination of pressure-representative and the particle velocity-representative signals. The enhanced seismic reflection signal is generated in such a way as to be substantially free of at least downwardly-propagating components of reverberation of the seismic wave within the water.

In a method of the type described above, the water velocity-representative and water pressure-representative signals can be scaled by multiplying at least a selected one of them by a scale factor dependent upon an acoustical impedance of the water. The scaled signals are then summed to produce the so-called enhanced seismic reflection signal.

According to one aspect of the invention, this scale factor can be expressed as $(\rho'\alpha'/\text{Dir}_{corr})*(G_p/G_v)$. Where $\rho'$ is a density of the water; $\alpha'$ is a velocity of propagation of the seismic wave in the water; $G_p$ is a transduction constant associated with the water pressure detecting step (e.g., a transduction constant of the transducer with which the water pressure is recorded); $G_v$ is a transduction constant associated with the water velocity detecting step (e.g., a transduction constant of the transducer with which the particle velocity is detected); and $\text{Dir}_{corr}$ is a directivity correction factor associated with an angle of propagation of the seismic wave in the water.

According to another aspect of the invention, the directivity correction factor, $\text{Dir}_{corr}$, is expressed as a function of $\gamma_p'$, the angle of propagation from vertical of the seismic wave in the water. Here, $\text{Dir}_{corr}$ is equal to $\cos(\gamma_p')$ for $\gamma_p'$ less than a selected critical angle and, otherwise, is equal to 1. The critical angle is a function of the propagation velocity of the seismic wave and is substantially equal to $\arcsin(\alpha'/\alpha)$; where $(\alpha')$ is the velocity of propagation of the seismic wave in the water and $(\alpha)$ is a velocity of propagation of the seismic wave in an earth material at said water's bottom.

In another aspect, the invention provides a method for seismic reflection prospecting in water covered areas in which the water pressure and particle velocity signals are generated by detectors placed on, or substantially near, the water's bottom. As above, the pressure and velocity measured by those detectors can be scaled and summed to produce an enhanced seismic reflection signal. Here, however, the scale factor depends upon an acoustical impedance of a solid earth material at the water's bottom and is defined by the term $(\rho\alpha/\text{Dir}_{corr})*(G_p/G_v)$, where $(\rho)$ is the density of the earth material at the water's bottom; $(\alpha)$ is the propagation velocity of the seismic wave in that earth material; and $\text{Dir}_{corr}$, $G_p$ and $G_v$ are defined as above.

The aforementioned scale factor can be determined statistically or deterministically. The former involves determining the ratio of a selected lag of the autocorrelation of the water pressure to a selected lag of crosscorrelation of the water pressure and water velocity at selected lag values or, preferably, determining the ratio of a selected lag of the autocorrelation of the water pressure to a selected lag of the water velocity. The selected lags can correspond, for example, to a time of two-way travel of seismic wave through said water between the position at which the pressure and velocity detectors reside and the water's surface. Preferably, however, the selected lag is zero.

Derivation of the scale factor deterministically involves generating a pressure wave from a position above the sensor point (i.e., the point at which the pressure and particle velocity readings are taken during seismic data collection). The scale factor can then be derived from the ratio of the absolute values of the pressure and particle velocity magnitudes at the sensor point during selected arrivals, e.g., the first arrival of that pressure wave.

In another aspect, the invention provides an apparatus for marine seismic reflection prospecting that operates according to the principles defined above.

These and other aspects of the invention are evident in the drawings and in the description which follows.

BRIEF DESCRIPTION OF THE DRAWINGS

A fuller appreciation of the invention may be attained by reference to the accompanying drawings, in which

FIG. 13 is a table of physical constants; and

DESCRIPTION OF THE ILLUSTRATED EMBODIMENT

Figure 1:
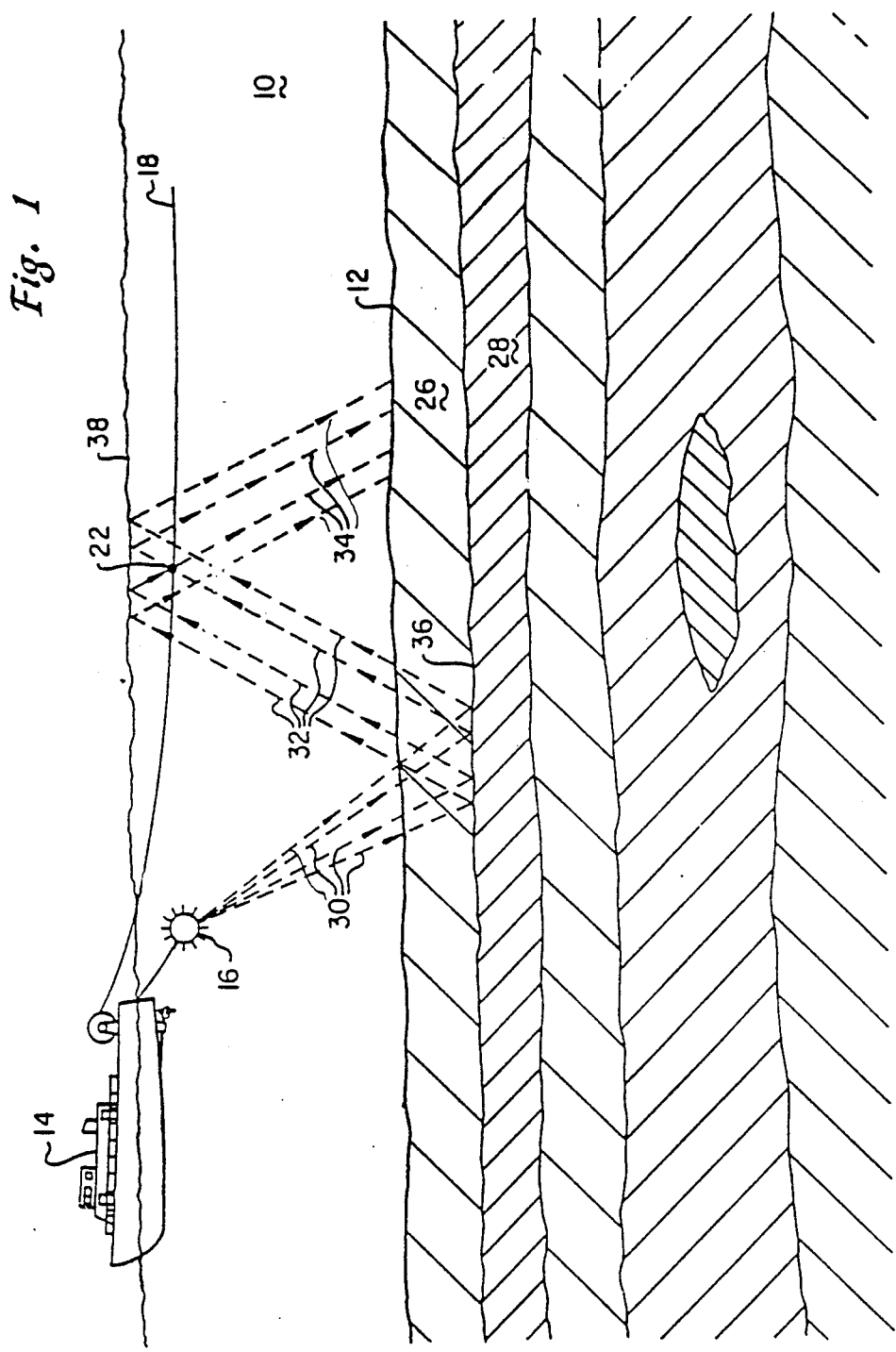
FIG. 1 depicts a preferred marine seismic reflection prospecting system constructed in accord with the invention.

FIG. 1 depicts a preferred marine seismic reflection prospecting system constructed in accord with the invention and having a hydrophone/geophone sensor pair disposed above the water bottom. In the illustration, a marine craft 14 tows a seismic source 16 and streamer 18 through a body of water 10, e.g., a lake or ocean, overlying a portion of the earth's surface 12 to be studied. The source 16 is preferably an acoustic energy source, e.g., an explosive device or compressed air gun, constructed and operated in a manner conventional to the art.

Illustrated streamer 18 includes sensor 22, including a hydrophone for detecting water pressure and a geophone for detecting water particle velocity. The steamer 18 and its accompanying hydrophone/geophone pair 22 are constructed and operated in a manner conventional to the art. In this regard, it will be appreciated, for example, that whereas only one sensor 22 is shown, in practice the streamer 18 could include a plurality of such units.

According to a preferred practice, the streamer 18 and hydrophone/geophone pair 22 are positioned on the water's bottom. Such an arrangement is ideal for use in three dimensional "bottom-cable" operations, where a long cable with sensors is deployed on the bottom 12, and a set of parallel lines, or swath, is shot with an airgun source 16. When the swath of shot lines is completed, the bottom cable 18 is retrieved and redeployed in a line displaced from, but parallel to, the previous location. There, another swath of shot lines is shot.

More particularly, a cable 18 with identical spatial arrays of hydrophones and geophones, with each individual hydrophone having a gimballed geophone positioned next to it, is deployed on the water bottom. A separate electrical signal is sent to the recording system for each hydrophone and each geophone spatial array. The marine vessel 14 fires source 16 at predetermined locations while the signals from the hydrophone and geophone arrays are recorded. These data are referred to as reflection data.

Preferably, before the water-bottom cable is retrieved and redeployed, the shooting vessel 14 makes one traverse directly over the cable 18, shooting the marine seismic source 16 directly over each spatial array of hydrophones and geophones, e.g., pair 22, or as close thereto as practical. The resulting signals from the two arrays directly below the source are recorded. These data are referred to as calibration data.

In accord with this preferred practice, the recorded hydrophone and geophone reflection data are demultiplexed, gain-removed and amplitude recovered using identical amplitude recovery curves. Here, the gain-removal process properly uses the K-gain settings of the recording instruments.

The calibration data are also demultiplexed and gain-removed. Here, again, the gain-removal process properly uses the K-gain settings of the recording instruments. The particle velocity component of the geophone reflection and calibration data are then multiplicatively scaled by a factor $$(G_p/G_v)(p')(\alpha')$$

where
$G_p$ = hydrophone array transduction constant in units, for example, of volts/Newton/square meter
$G_v$ = geophone array transduction constant (volts/meter/second)
$P'$ = density of water (kilograms/cubic meter)
$\alpha'$ = sound velocity of water (meters/second)

The illustrated system uses a filter designed in accord with the theoretical or measured impulse responses of the hydrophones and geophones to convert the phase spectrum and normalized amplitude spectrum of the geophone to match that of the hydrophone, or vice versa. This filter is applied to every trace of the reflection and calibration geophone data or the hydrophone data subsequent to scaling.

In further accord with a preferred practice, a scale factor K is determined from the calibration data for each receiver station (i) by dividing the hydrophone first-arrival peak amplitude by the geophone first-arrival peak amplitude and taking the absolute value of the resultant value. Then, for each pair of traces recorded at receiver location (i), the geophone trace is multiplied by a factor K (not to be confused with the "K-gain" of the transducers) and added to the hydrophone trace.

The resulting data are then processed in the manner conventional to the art for water-bottom cable data.

According to another preferred practice, the factor K is calculated as the absolute value of the geophone first-arrival peak divided by the hydrophone first-arrival peak. Here, K is multiplied by the hydrophone trace prior to adding it to the geophone trace.

In another preferred practice, the factor K applied to the geophone traces is determined statistically, i.e., from the hydrophone and geophone reflection data. Using portions of traces where clean, vertical reflections are evident or, using stacked traces, K is estimated by way of any of the following expressions:

$$K = \Phi_{pp}(0)/\Phi_{vv}(0)$$

$$(-\Phi_{pp}(2d/\alpha')/\Phi_{vv}(2d/\alpha'))^{\frac{1}{2}}$$

$$K = -\Phi_{pp}(2d/\alpha')/\Phi_{pv}(2d/\alpha')$$

where
$\Phi_{pp}$ = autocorrelation function of a hydrophone trace
$\Phi_{vv}$ = autocorrelation function of a geophone trace
$\Phi_{pv}$ = crosscorrelation function of a hydrophone and geophone trace
d = water depth (meters)
$\alpha'$ = sound velocity in water (meters/second)

According to yet another preferred practice, if the calibration data were not shot and the signal-to-noise ratio of the data is too poor for the above method using autocorrelation and crosscorrelation functions to yield stable values of K, the factor K is determined as follows. Geophone traces are multiplied by a range of potential, or candidate, factors, K, and added to their respective hydrophone traces. The resulting data is then stacked. Autocorrelation functions and amplitude spectra of the stacked data sets are computed and displayed. By iteratively performing these steps, an optimal value of K can be determined which minimizes the effects of the water-column reverberations.

Referring again to FIG. 1, during data collection, seismic waves generated by seismic source 16 travel downward, as indicated by rays 30 and are reflected off earth strata 26, 28 or, more particularly, off the interface 36 between those strata. The upwardly reflected waves 32 travel past the area occupied by the streamer 18 to the water's surface 38. During their first, or primary, passing the waves 32 are detected by the sensor 22 which generates electrical signals representative of pressure and particle velocity changes inherent to the wavefield and transmit those signals back to the vessel 14 for recording and processing.

Upon striking the water/air interface 38, most of the energy in the wavefield 32 is reflected back toward the water bottom 12, as indicated by rays 34, resulting in a second, downwardly travelling set of reflection data, or ghosts. These ghost reflections once again pass through the area occupied by the streamer 18, causing the hydrophone/geophone pair 22 to generate a further set of electrical signals. Depending upon the nature of the earth material at the water's bottom 12, a significant portion of the energy in the ghost reflections striking the water's bottom may once again be reflected back upward, creating a further ghost wavefield (not shown). In addition, the water 10 often carries reverberant wavefields of trapped coherent energy, e.g., excess energy or noise generated by source 16 and by marine craft 14. This energy, which is not shown in the illustration, also reverberates in the manner discussed above between water surface 38 and bottom 12.

Because the ghost reflections and trapped coherent energy tend to overlap, or interfere with, the primary reflections, raw marine seismic reflection data is difficult to interpret. Whereas prior art schemes such as those disclosed in the Ruehle patent have focused on the use of filtering schemes to eliminate ghost reflection data, the inventor named herein has discovered that coherent noise (both trapped and ghost) can be reduced by applying a selected scale factor to the outputs of a pressure transducer and a particle velocity transducer positioned substantially adjacent one another and, preferably, on the water's bottom. The scale factor, which can be derived from the acoustical impedance of the water or water-bottom material, may be determined either deterministically and statistically, as discussed more fully below.

Figure 2:
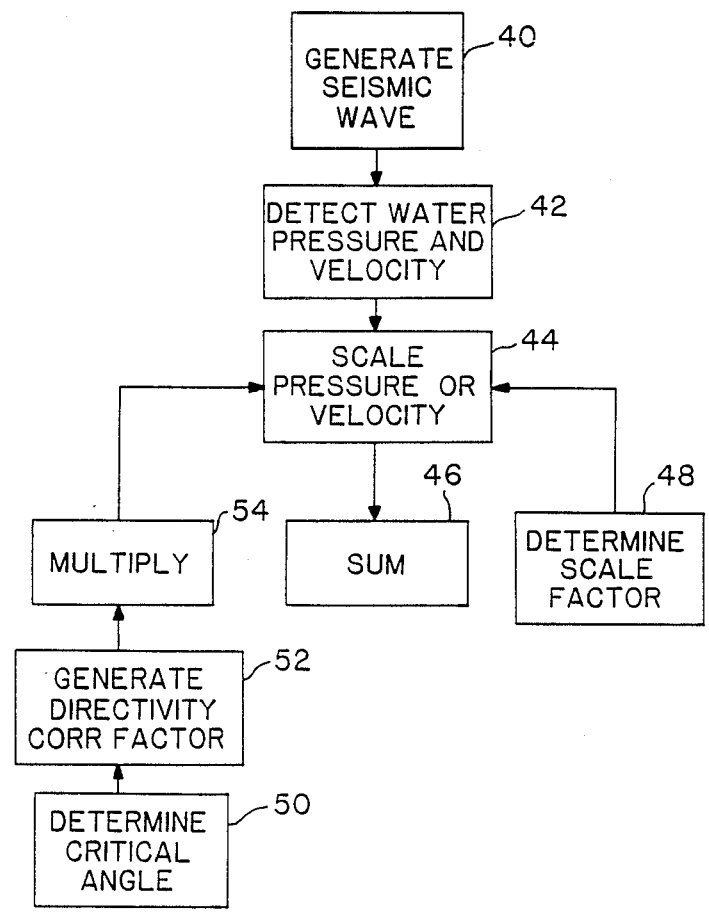
FIG. 2 outlines a preferred operating sequence for a marine seismic reflection system of the type shown in FIG. 1.

FIG. 2 outlines a preferred operating sequence for a marine seismic reflection system of the type shown in FIG. 1. As shown in step 40, seismic source 16 generates an acoustic wave for transmission through the water and reflection from earth strata 26, 28. Wavefields representing primary and ghost reflections, as well as those coherent noise, travel through the water and past the streamers, where they are detected by hydrophone/geophone pair 22, as indicated in step 42. The pair generates a water pressure-representative signal and a particle velocity-representative signal for recording and processing according to the teachings provided herein. As indicated above, the hydrophone/geophone pair 22 may be positioned anywhere in the water and, preferably, on or near the water's bottom 12.

In steps 44 and 46, the system generates an enhanced seismic reflection signal representing a selected linear combination of the water pressure and the water velocity. In embodiments where the pressure and particle velocity detectors are positioned at a point above the water's bottom, this enhanced seismic reflection signal is characterized as being substantially free of at least downwardly-propagating components of reverberation of said seismic wave within the water. In preferred embodiments, where those detectors are positioned at the water's bottom, the enhanced seismic reflection signal is characterized as being substantially free of both upwardly and downwardly propagating components of reverberation.

More particularly, in step 44 of the illustrated sequence, the system scales the water pressure-representative signal and the particle velocity-representative signal by multiplying at least one of them by a scale factor dependent on an acoustical impedance of a substance through which the wavefields travel, e.g., (a) the acoustical impedance of the water, if the hydrophone/geophone pair is positioned at a point in the water 10 above the bottom 12; and
(b) the acoustical impedance of the earth material 26 at the water's bottom, if the hydrophone/geophone pair is positioned on the bottom 12.

Preferably, the system executes step 44 by multiplying the recorded particle velocity function by a scale factor as derived below and by multiplying the measured pressure function by one.

A scale factor, determined in step 48, for use in conjunction with a hydrophone/geophone pair Positioned at a point in the water above the bottom is $$(\rho' \alpha' / \text{Dir}_{corr}) * (G_p / G_v)$$

where $\rho'$ is a density of the water; $\alpha'$ is a velocity of propagation of the seismic wave in the water; $G_p$ is a transduction constant associated with the water pressure detecting step (e.g., a transduction constant of the transducer with which the water pressure is recorded); $G_v$ is a transduction constant associated with the water velocity detecting step (e.g., a transduction constant of the transducer with which the particle velocity is detected); and $\text{Dir}_{corr}$ is a directivity correction factor associated with an angle of propagation of the seismic wave in the water.

A preferred sequence for computing the scale factor is described below in conjunction with FIG. 7.

The aforementioned directivity correction factor, $\text{Dir}_{corr}$, is expressed as a function of $\gamma_p'$, the angle of propagation from vertical of the seismic wave in the water. Here, $\text{Dir}_{corr}$ is equal to $\cos(\gamma_p')$ for $\gamma_p'$ less than a selected critical angle and, otherwise, is equal to 1. The critical angle is a function of the propagation velocity of the seismic wave and can be substantially equal to $\arcsin(\alpha'/\alpha)$, where ($\alpha'$) is the velocity of propagation of the seismic wave in the water and ($\alpha$) is a velocity of propagation of the seismic wave in an earth material at said water's bottom.

A preferred sequence for calculating the aforementioned directivity correction factor is shown in steps 50–54 of FIG. 2. Particularly, in step 50, the system determines the critical angle. As indicated above, this angle is determined by computing $\arcsin(\alpha'/\alpha)$.

A preferred scale factor for use in conjunction with a hydrophone/geophone pair positioned at the water bottom is $$(\rho \alpha / \text{Dir}_{corr}) * (G_p / G_v)$$

where ($\rho$) is the density of the earth material at the water's bottom; ($\alpha$) is the propagation velocity of the seismic wave in that earth material; and $\text{Dir}_{corr}$, $G_p$ and $G_v$ are defined as above.

Figure 14:
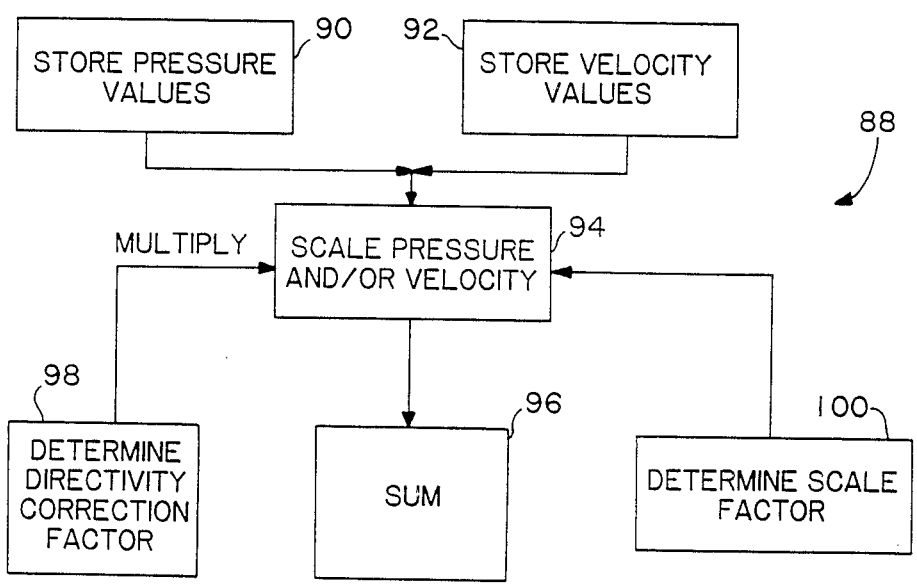
FIGS. 14–15 depict preferred configurations of elements used in an apparatus constructed in accord with the invention.

FIG. 14 depicts a preferred configuration of elements in a system constructed in accord with the invention and operating with the method shown in FIG. 2. The illustrated system 88 includes stores 90 and 92 for retaining pressure-representative and particle velocity-representative signals generated by hydrophone/geophone pair 22. Element 94 scales the pressure and/or velocity signal as described above in conjunction with step 44 (FIG. 2). Element 96 sums the scaled pressure and velocity signal as discussed above in conjunction with step 46 (FIG. 2). The illustrated system 88 further includes element 98 for determining a directivity correction factor as discussed above in conjunction with steps 50 and 52. That correction factor is multiplied, in accord with the teachings provided herein, as indicated over the data flow path indicator connecting elements 98 and 94. System 88 further includes element 100 for determining a scale factor in the manner discussed above in conjunction with step 48, above.

An apparatus constructed in accord with FIG. 14 and operating according to the method of FIG. 2 can be implemented in special purpose hardware using implementation techniques conventional to the art. Preferably, however, such apparatus is implemented on a general purpose digital data processor having conventional seismic data processing software tools. One preferred package of software tools is commercially available from the assignee hereof under the mark "TIPEX."

A further understanding of the invention and, more particularly, the aforementioned scale factor, may be attained by reference to the discussion which follows.

RELATIONSHIP BETWEEN UPWARD AND DOWNWARD TRAVELLING PRESSURE AND PARTICLE VELOCITY WAVES

Figure 3:
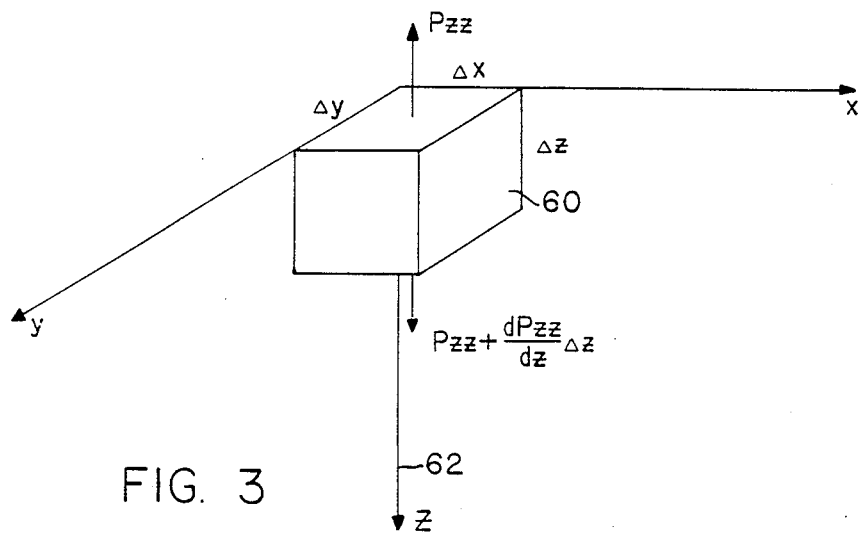
FIG. 3 depicts a cube of matter through which a pressure wave travels.

In order to understand the relationship between upward and downward traveling pressure and particle velocity fields, it is helpful to focus on a very small cube of matter 60, as shown in FIG. 3.

In this figure, the ray marked $p_{zz}$ indicates the stress (pressure) acting in the outward direction from the cube 60 and in the direction of the z-axis 62. As shown, the net force operating on the cube in the +z direction may be expressed as follows $$F_z = (p_{zz} + (\partial p_{zz}/\partial z)\Delta z)\Delta x \Delta y - p_{zz}\Delta x \Delta y$$

$$F_z = (\partial p_{zz}/\partial z)\Delta x \Delta y \Delta z$$

The mass of the cube 60 may be expressed as $$m = \rho \Delta x \Delta y \Delta z$$

where $\rho$ is the density of the cube
While, the acceleration of the cube in the +z direction may be expressed as $$a_z = \partial v_z/\partial t$$

Since $$F_z = m a_z$$

then $$\partial p_{zz}/\partial z = \rho(\partial v_z/\partial t)$$

As used herein, compression is expressed as a positive pressure pulse, accordingly $$p = -p_{zz}$$

since $p_{zz}$ causes a rarefaction; where p is a scaler value.

Likewise, with respect to a geophone sitting upright on the xy plane of FIG. 3, as used herein a positive velocity pulse will be expressed as a "bump" in the −z direction. Accordingly, $$v = -v_z$$

Substituting this into the above, $$\partial p/\partial z = \rho(\partial v/\partial t) \qquad \text{[Eq. 1-1]}$$

Figure 4:
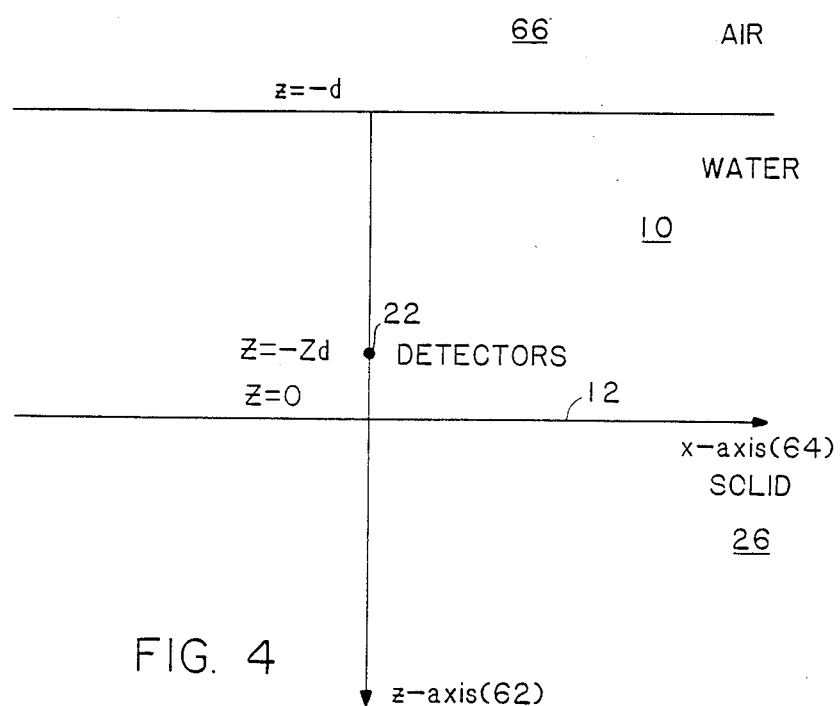
FIG. 4 depicts a simplified physical model of an environment in which the invention operates.

FIG. 4 depicts a simplified physical model of the environment in which the invention is practiced. More particularly, the illustration shows the air 66, water 10 and solid earth material 26 below the water bottom 12. Hydrophone/geophone pair 22 is shown in the water at a point above the water bottom 12. For purposes of the immediate discussion, it is assumed that plane waves vary in the direction of the x-axis 64 and the z-axis 62, but not in the direction of the y-axis.

For convenience, in the illustration z=0 is shown to be at water bottom 12. The water 10 depth is equal to (d) and the detector 22 is $z_d$ meters above the water bottom.

A plane pressure wave traveling in the −z direction in the solid can be expressed as $$p_u = \delta(t + (z + \alpha))$$

where $\delta(t)$ represents the Dirac delta function.

Likewise, a pressure wave traveling in the +z direction in the solid may be expressed as $$p_d = \delta(t - (z/\alpha))$$

Using [Eq. 1-1] to determine the corresponding particle velocity plane waves $$\partial v_u/\partial t = (1/\rho)(\partial p_u/\partial z) = )1/\rho\alpha)\delta'(t + (z/\alpha))$$

$$v_u = (1/\rho\alpha)\delta(t + (z/\alpha))$$

Likewise, $$v_d = -(1/\rho\alpha)\delta(t - (z/\alpha))$$

So, from the foregoing, the relationships necessary to develop the responses of detectors 22 (i.e., a hydrophone/geophone pair) to vertically propagating waves are:

For the solid material 26 at the water's bottom:

$$p_u = \delta(t + (z/\alpha))$$

$$v_u = (1/\rho\alpha)\delta(t + (z/\alpha)$$

$$p_d = \delta(t - (z/\alpha))$$

$$v_d = (1/\rho\alpha)\delta(t - (z/\alpha)) \qquad \text{[Eq. 1-2]}$$

For the water 10:

$$p_u' = \delta(t + (z/\alpha'))$$

$$v_u' = (1/\rho'\alpha')\delta(t + (z/\alpha'))$$

$$p_d' = \delta(t - (z/\alpha'))$$

$$v_d' = -(1/\rho'\alpha')\delta(t - (z/\alpha')) \qquad \text{[Eq. 1-3]}$$

DETECTOR RESPONSES TO REFLECTIONS AT ARBITRARY HEIGHT ABOVE WATER BOTTOM

A vertically traveling reflection wavefield in the solid 26 of FIG. 4 can be represented as $$p_u = \delta(t + (z/\alpha))$$

This implies that t=0 corresponds to the instant the wave arrives at the water-bottom 12, i.e., at z=0.

Of course, a portion of the pressure wave will be reflected back in the −z direction.
Therefore, $$P_d = R'\delta(t - (z/\alpha))$$

where $R' = (\rho'\alpha' - \rho\alpha)/(\rho'\alpha' + '\alpha)$ and is defined as the normal incidence reflection coefficient At the instant an incident wave strikes the water-bottom 12, the pressure field on the solid side of the solid/water interface is $$p = p_u + p_d = (1 + R')\delta(t)$$

To avoid infinite acceleration of molecules at the solid/water interface, the pressure field on the water side of the interface must equal that on the solid side, at that instant of time. Accordingly, the amplitude of the transmitted pressure wave in the water is equal to $1 + R'$.
Therefore, $$p_u' = (1 + R')\delta(t + (z/\alpha'))$$

$$p_u' = T\delta(t + (z/\alpha))$$

where T is the normal incidence transmission coefficient and equals $1 + R'$.

From [Eq. 1-3], the corresponding particle velocity wave is $$v_u' = (1/\rho'\alpha')T\delta(t+(z/\alpha'))$$

Since the detectors 22 are located at an arbitrary distance $z_d$ meters above the water-bottom, these waves will arrive at the detectors 22 at $t=(z_d/\alpha')$ seconds. The outputs of the pressure and velocity detectors can, accordingly, be expressed as $$p(t) = T\delta(t\delta(t-(z_d/\alpha'))$$

$$v(t) = (T/\rho'\alpha')\delta(t-(z_d/\alpha')) \quad [\text{Eq. 2-1}]$$

Note that [Eq. 2-1] does not take into account the transduction constants of the pressure and velocity detectors, nor any differences in their response characteristics to their respective fields. The use of these transduction constants is discussed below.

Referring to [Eq. 2-1], it will be appreciated that for a vertically arriving reflection pulse, the pressure and velocity signals are in phase; their relative amplitudes are related only by the acoustic impedance of the water ($\rho'\alpha'$); and, with some qualification, these two observations are true independent of the value of z.

Returning to FIG. 4, an upward-traveling pressure wave will continue until it encounters the air/water interface (i.e., the interface between the water 10 and the air 66). This interface has a reflection coefficient equal to $-1$. Accordingly, the pressure wave is reflected downward, in its entirety, and its sign is changed, i.e. from a compression pulse to a rarefaction pulse.

Therefore, the initial downwardly travelling component of the pressure wave can be represented by the equation $$p_d' = -T\delta(t-((2d-z)/\alpha'))$$

and, from [Eq. 1-3], the downwardly travelling component of the velocity wave can be represented by the equation $$v_d' = (T/\rho'\alpha')\delta(t-((2d-z)/\alpha'))$$

These waves will strike detectors 22 at $$t = (2t - z_d y\alpha'$$

Accordingly, these signals can be added to [Eq. 2-1] to produce the outputs:

$$p(t) = T\delta(t-(z_d/\alpha')) - T\delta(t-((2d-z_d)/\alpha'))$$

$$v(t) = )T/\rho'\alpha')\delta(t-(z_d/\alpha')) + (T/\rho'\alpha')\delta(t-((2d-z_d)/\alpha')) \quad [\text{Eq. 2-2}]$$

where, [Eq. 2-2] represents responses to the initial upwardly-travelling and downwardly-travelling components of the pressure and particle velocity waves.

The downward-traveling pressure and velocity waves continue until they again encounter the water-bottom interface 12, which is represented by the reflection coefficient $$R = (\rho\alpha - \rho'\alpha')/(\rho\alpha + \rho'\alpha')$$

Accordingly, the reflected pressure wave becomes $$p_u' = -RT\delta(t+((2d+z)/\alpha'))$$

and from [Eq. 1-3]

$$v_u' = -(RT/\rho'\alpha')\delta(t+((2d+z)/\alpha'))$$

These waves encounter detectors 22 at time $$t = (2d+z_d)/\alpha'$$

[Eq. 2-2] can be updated to include these new signals, i.e., to represent the initial upwardly-travelling and downwardly-travelling components as well as the subsequent upwardly-travelling wave, as follows:

$$p(t) = T\delta(z_d/\alpha')) - T\delta(t-((2d-z_d)/\alpha')) - RT\delta(t-((2d+z_d)/\alpha'))$$

$$v(t) = (T/\rho'\alpha')\delta(t - (z_d/\alpha')) + (T/\rho'\alpha')\delta(t - ((2d - z_d)/\alpha')) - (RT/\rho'\alpha')\delta(t - ((2d + z_d)/\alpha'))$$

Figure 5:
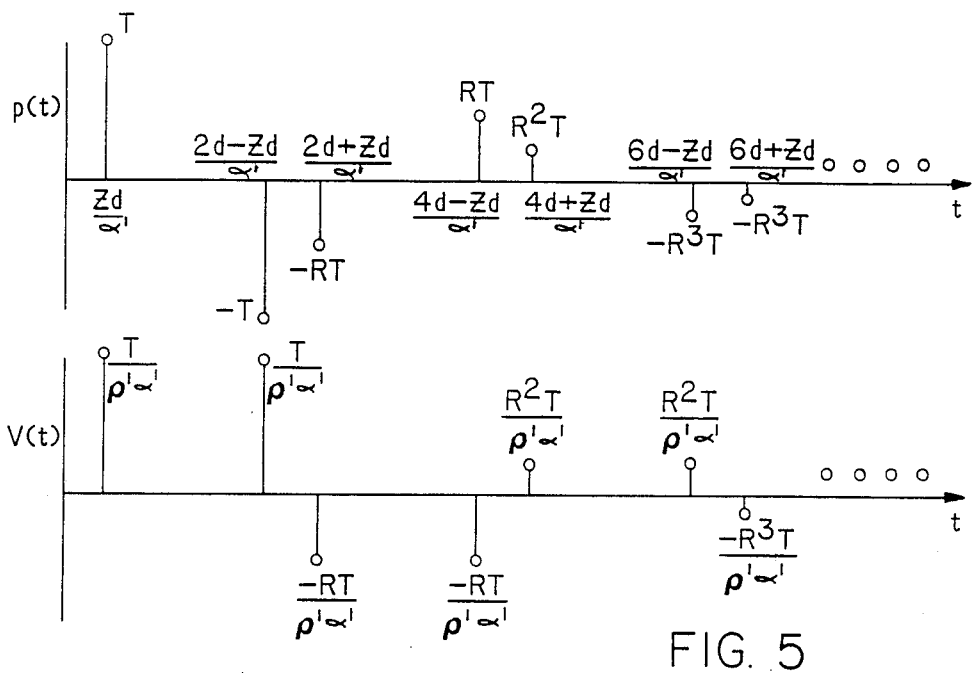
FIG. 5 depicts pressure and velocity waveforms arriving at a detector shown in FIG. 4.

The above process continues ad infinitum, and the signals p(t) and v(t) can be illustrated in FIG. 5.

Referring to FIG. 5, it is evident that if the detectors 22 are disposed at a position above the water bottom, i.e., $z_d < d$, v(t) can be scaled by $\rho'\alpha'$ and added to p(t) to yield the sum signal, s(t) as follows $$s(t) = p(t) + \rho'\alpha' v(t)$$

$$s(t) = 2T\delta(t-(z_d/\alpha')) - 2RT\delta(t-((2d-z_d)/\alpha')) + 2R^2T\delta(t-((4d-3l\ z_d)/\alpha'))-31 \ldots$$

Comparing this to p(t), it is evident that all downwardly propagating components of the reverberations have been eliminated. While, the upward-Propagating components remain.

It is, accordingly, seen that a marine prospecting system of the type depicted in FIG. 1 and constructed in accord with one preferred practice of the invention, where the detectors 22 are positioned above the water's bottom, can eliminate downwardly travelling components of coherent reverberations if the pressure function is added to the velocity function, where the later is scaled by $\rho'\alpha'$.

DETECTOR RESPONSES TO REFLECTION AT THE WATER BOTTOM

Figure 6:
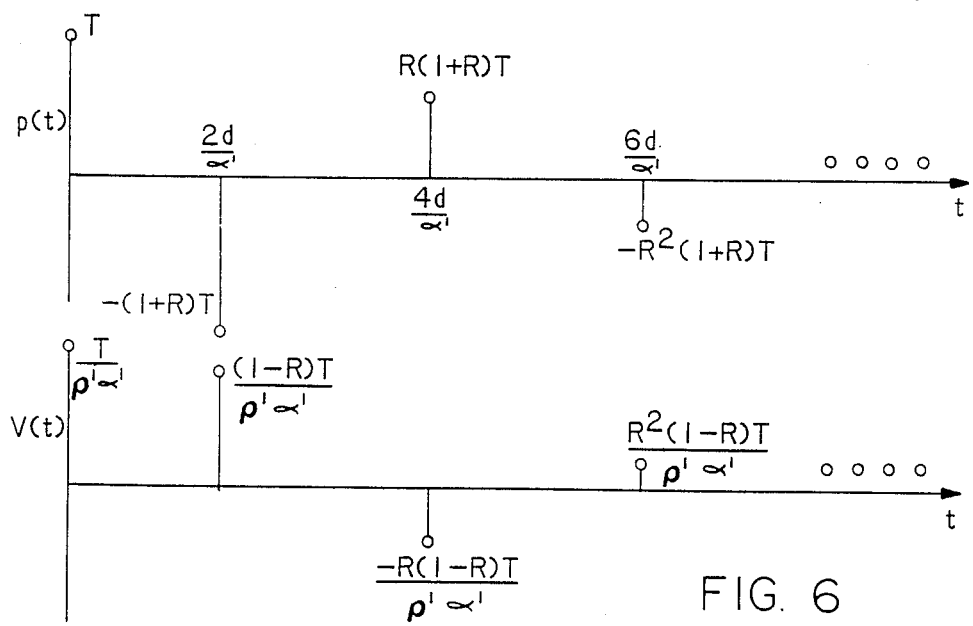
FIG. 6 depicts the waveforms of FIG. 5 modified for detectors placed on the water bottom.

If the detectors 22 are disposed at the water bottom 12, i.e., at $z_d = 0$, the pressure and particle velocity waves are modified, as shown in FIG. 6. Upon substitution of the corresponding values into the prior sum equation yields $$s(t) = p(t) + \rho'\alpha'((1+R)/(1-R))v(t)$$

and $$s(t) = T\}1 + ((1+R)/(1-R))\}\delta(t)$$

Here, it is seen that all the reverberations due to the reflection wavelet, both upgoing and downgoing, are eliminated. However, the scale factor for v(t), K, must be expressed as follows $$K = \rho'\alpha'((1+R)/(1-R))$$

$$K = \rho'\alpha'(\rho\alpha + \rho'\alpha' + \rho\alpha - \rho'\alpha')/(\rho\alpha + \rho'\alpha' - \rho\alpha + \rho'\alpha')$$

$$K = \rho\alpha$$

Since K depends on the acoustic impedance of the water-bottom material, a system constructed in accord with the invention must consider K to be a variable from survey area to survey area, and probably for each received group within a survey area.

If, instead, $(\rho'\alpha')$ were used to scale v(t), then $$s(t)=2t\delta(t)-2RT\delta(t-(2d/\alpha'))+2R^2T\delta(t-(4d/\alpha'))-\ldots$$

which is identical to [Eq. 2-3] with $z_d=0$.

CALIBRATION METHODS

Figure 7:
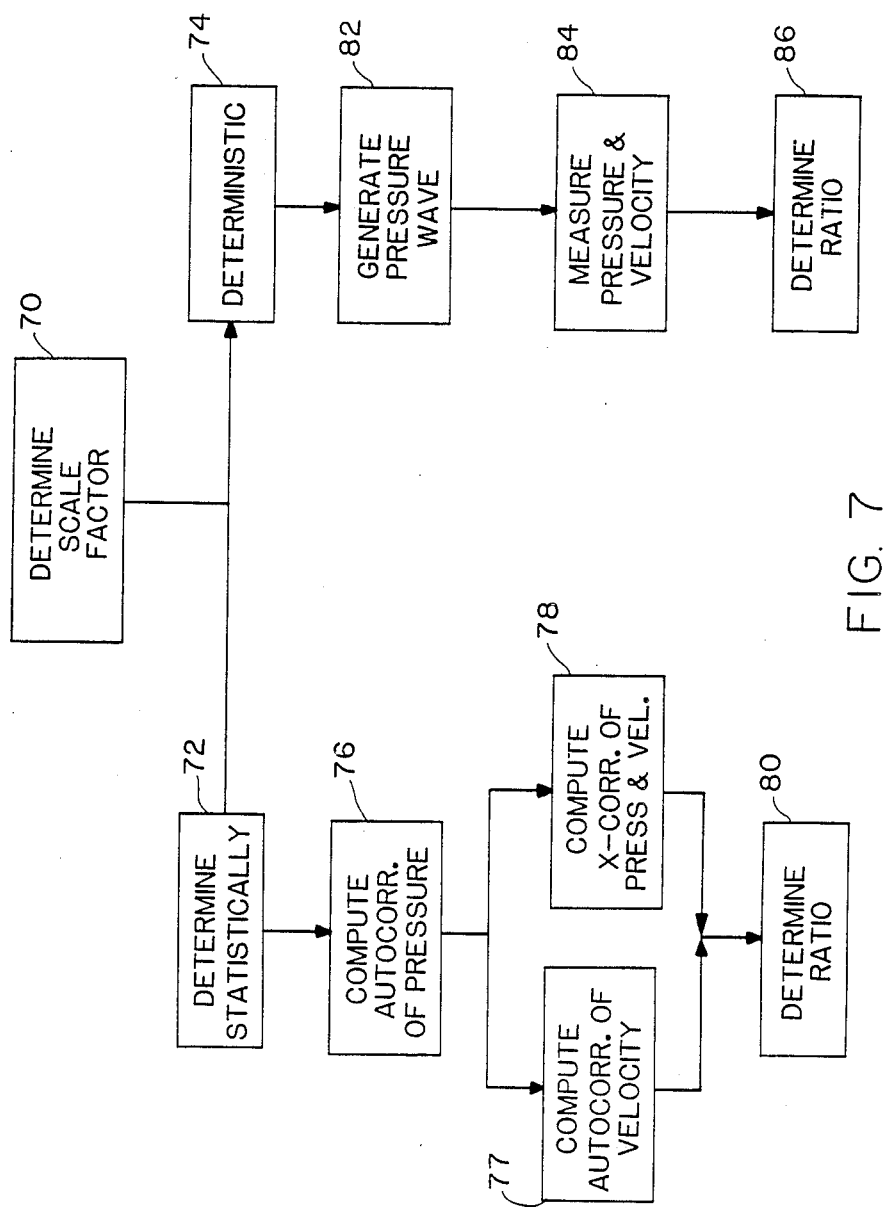
FIG. 7 depicts a preferred operating sequence for determining a scale factor in a system constructed in accord with a preferred practice of the invention.

FIG. 7 depicts a preferred processing sequence for determining the aforementioned scale factor deterministically and statistically. In the illustration, steps 70, 72 and 74 indicate a decision to determine the scale factor by one or both methods. While the deterministic method, which requires the sounding and measurement of transducer responsiveness, is preferred, the statistical method based on ratios of the pressure and particle velocity autocorrelations and crosscorrelations can also be used. Those skilled in the art will appreciate, of course, that both methods can be used in combination.

According to the statistical method 72, a marine seismic reflection system constructed in accord with the invention computes the autocorrelation of the pressure at a selected lag; see step 76. The system also computes the autocorrelation of the velocity at a selected lag; see step 77. Alternatively, the system computes the crosscorrelation of the pressure and particle velocity at a selected lag to wit, the two-way travel time of the seismic wave in the water column; see step 78. Preferably, the lags for the computations of steps 76 and 77 are zero. However, the lags for this combination can also be equal to the two-way travel time of the seismic wave between the sensor 22 and the water surface. In step 80, the system preferably divides the pressure autocorrelation by the velocity autocorrelation or, alternatively, the system divides the pressure autocorrelation by the pressure-velocity crosscorrelation.

In the discussion which follows, it is assumed that the velocity signal has been multiplied by the factor $$(G_p/G_v)(\rho'\alpha')$$

Mathematically, the autocorrelation/crosscorrelation ratio is expressed as follow.

$$\Phi_{pp}(\pm 2d/\alpha')=T^2\}-(1+R)-R(1+R)^2-R^3(1+R)^2-\ldots\}$$

$$\Phi_{pv}(2d/\alpha')=T^2\}(1-R)+R(1-R^2)+R^3(1-R^2)+\ldots\}$$

Therefore $$\frac{-\Phi_{pp}(\pm 2d/\alpha')}{\Phi_{pv}(2d/\alpha')} = \frac{(1+R)+R(1+R)^2+R^3(1+R)^2+\ldots}{(1-R)+R(1-R^2)+R^3(1-R^2)+\ldots}$$

$$= \frac{1+2R+2R^2+2R^3+2R^4+\ldots}{1-R^7+\ldots}$$

$$= \frac{1+R}{1-R}$$

which is equal to the required scale factor for v(t).

Mathematically, the ratio of the pressure and velocity autocorrelations at zero lag is expressed as follows.

$$\Phi_{pp}(0)=T^2\}1+)1+R)^2+R^2(1+R)^2+R^4(1+R)^2+\ldots\}$$

$$\Phi_{vv}(0)=T^2\}1+(1-R)^2+R^2(1-R)^2+R^4(1-R)^2+\ldots\}$$

Forming the ratio of these two values yields $$\frac{\Phi_{pp}(0)}{\Phi_{vv}(0)} = \frac{1+(1+R)^2+R^2(1+R)^2+R^4(1+R)^2+\ldots}{1+(1-R)^2+R^2(1-R)^2+R^4(1-R)^2+\ldots}$$

$$= \frac{1+R+R^2+R^3+R^4+R^5+R^6+\ldots}{1-R+R^2-R^3+R^4-R^5+R^6-\ldots}$$

$$\frac{\Phi_{pp}(0)}{\Phi_{vv}(0)} = \frac{1+R}{1-R}$$

Accordingly, K is obtained as follows:

$$K=(\Phi_{pp}(0)/\Phi_{vv}(0))$$

Further, the ratio of the pressure wave autocorrelation to the velocity wave autocorrelation at a lag equal to the two-way travel time of the seismic wave in the water column may be expressed mathematically as follows.

$$\Phi_{pp}(\pm 2d/\alpha')=T^2\}-(1+R)-R(1+R)^2-R^3(1+R)^2-\ldots\}$$

$$\Phi_{vv}(\pm 2d/\alpha')=T^2\}(1-R)-R(1-R)^2-R^3(1-R)^2-\ldots\}$$

Forming the following ratio:

$$\frac{-\Phi_{pp}(\pm 2d/\alpha')}{\Phi_{vv}(\pm 2d/\alpha')} = \frac{(1+R)+R(1+R)^2+R^3(1+R)^2+\ldots}{(1-R)-R(1-R)^2-R^3(1-R)^2-\ldots}$$

$$= \frac{1+2R+2R^2+2R^3+2R^4+\ldots}{1-2R+2R^2-2R^3+2R^4-\ldots}$$

$$\frac{-\Phi_{pp}(\pm 2d/\alpha')}{\Phi_{vv}(\pm 2d/\alpha')} = [(1+R)/(1-R)]^2$$

Therefore $$K=\}\Phi_{pp}(\pm 2d/\alpha')/\Phi_{vv}(\pm 2d/\alpha')\}^{\frac{1}{2}}$$

According to the deterministic method 74, a seismic energy source 16 is used to generate a pressure wave at a point disposed directly above the location of the sensor 22 in the water; see step 82. The output of the pressure and particle velocity detectors of the sensor 22 are then measured at a selected arrival of the resulting pressure wave; see step 84. A ratio of this measured pressure signal to the particle velocity signal is then used as the aforementioned scale factor; see step 86.

Figure 15:
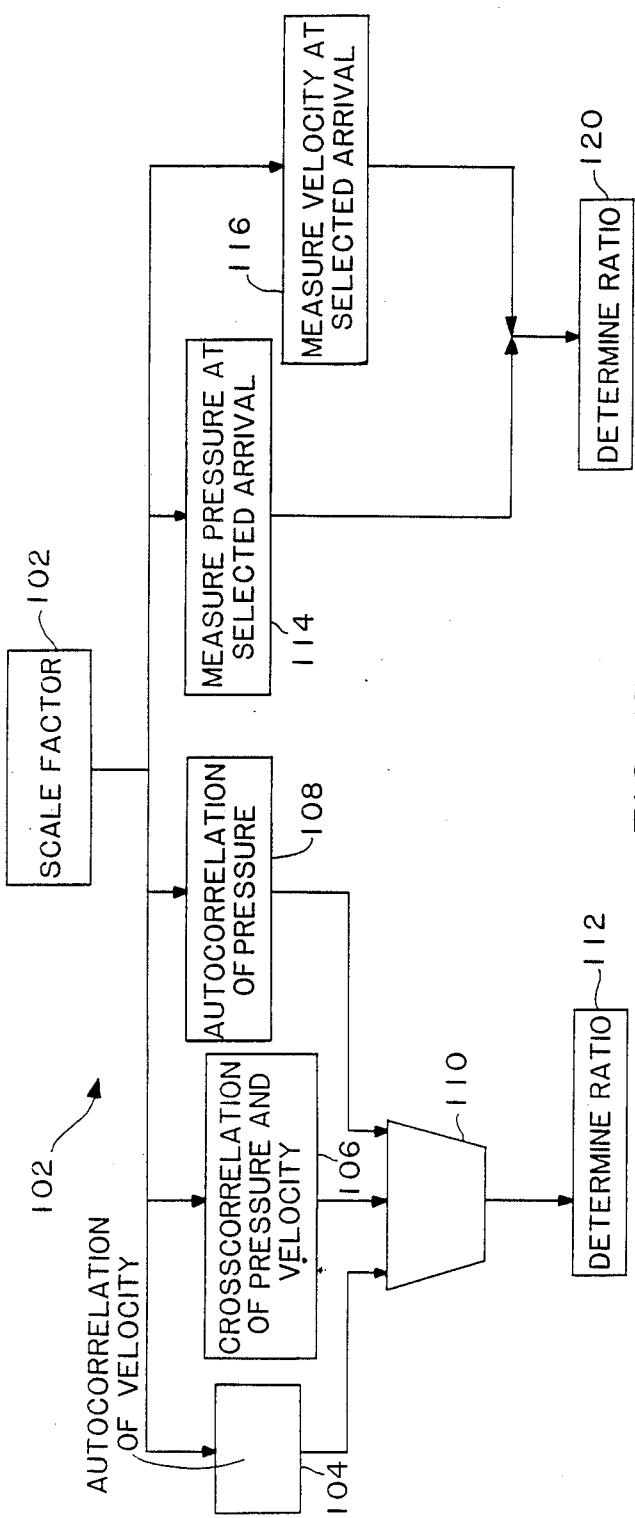

FIG. 15 depicts a preferred configuration of elements 102 used for determining a scale factor in a system constructed and operated in accord with the invention.

In the configuration, statistical determinations are handled by elements 104–112 which are implemented to carry out the processes described above in conjunction with 72 and 76–80 (FIG. 7). More particularly, the illustrated configuration 102 includes element 102 for routing data and controlling the other scale factor-determining elements, e.g., elements 104–120. Illustrated element 104 selectively determines an autocorrelation of the particle velocity signal. Element 106 selectively determines a crosscorrelation of the pressure and particle velocity signals, while element 108 selectively determines an autocorrelation of the pressure signal. The output of the autocorrelation and crosscorrelation elements 104–108 is routed through multiplexor 110 which selectively routes the appropriate values to element 112 for ratio calculations.

In the configuration, deterministic determinations are handled by elements 114–120 which are implemented to carry out the processes described above in conjunction with steps 74 and 82–86 (FIG. 7). More particularly, the illustrated apparatus 102 includes elements 114 and 116 for identifying a selected arrival of the pressure wave, as described above in conjunction with step 84 (FIG. 7). The apparatus also includes element 120 for determining a ratio of the arrival-representative signal, as described above in conjunction with step 86 (FIG. 7).

An apparatus constructed in accord with FIG. 15 and operating according to the method of FIG. 7 can be implemented in special purpose hardware using implementation techniques conventional to the art. Preferably, however, such apparatus is implemented on a general purpose digital data processor having conventional seismic data processing software tools. One preferred package of software tools is commercially available from the assignee hereof under the mark "TIPEX."

GENERAL ANGLE-OF-INCIDENCE ANALYSIS

Figure 8:
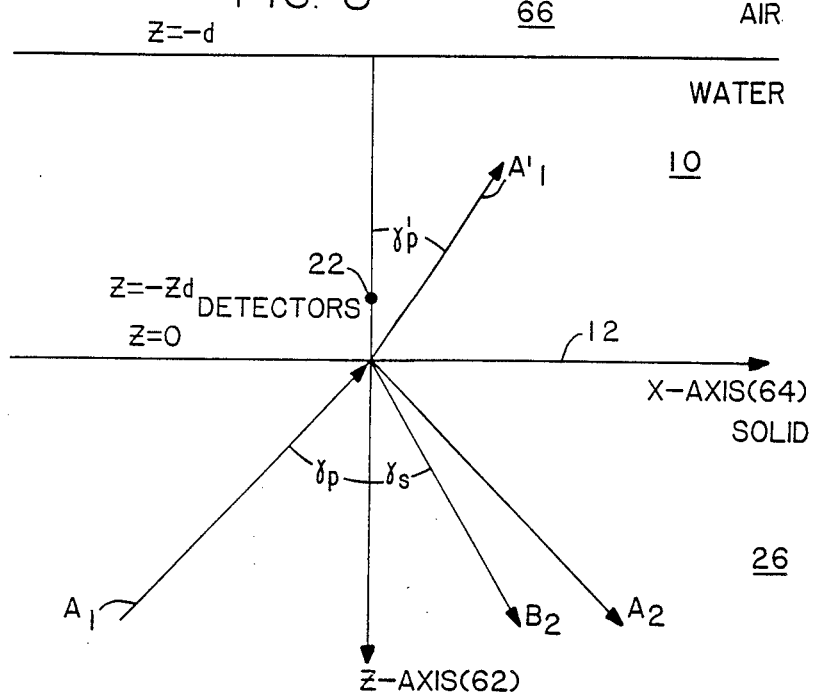
FIGS. 8–10 depicts further simplified physical models of an environment in which the invention operates.

FIG. 8 depicts the environment of FIG. 4 in a manner required to permit analysis of the more complicated case of a p-wave reflection $A_1$ arriving at the water-bottom at angle-of-incidence $\gamma_p$ from vertical. In this and subsequent figures, rays marked with the letter A (or A', etc.) denote p-waves, while those marked with the letter B denote s-waves.

In the discussion which follows, three types of water-bottom materials will be referred to as Normal, Hard and Soft. The physical properties for these three materials (and water) are contained in FIG. 13. For the Normal water-bottom, the following velocity relationships apply:

$$\alpha > = \alpha' > = \beta$$

Since the phase velocity of the arriving wave-front along the x-axis can be expressed as $$c = (\alpha/\sin\gamma_p) = (\beta/\sin\gamma_s) = (\alpha'/\sin\gamma_p')$$

then $$|c| > = \alpha > = \alpha' > = \beta$$

$$(\alpha/\sin\gamma_p) > = \alpha$$

$$\sin\gamma_p > = 1$$

$$\gamma_p < = 90°$$

In like manner, the ranges of values for the angles $\gamma_s$ and $\gamma_p'$ can be determined, resulting in $$0 < = \gamma_p < = 90°$$

$$0 < = \gamma_s < = \sin^{-1}(\gamma/\alpha) = 20.7°$$

$$0 < = \gamma_p' < = \sin^{-1}(\alpha'/\alpha) = 61.9°$$

Using the method described by White in the text *Seismic Waves - Radiation, Transmission, and Attenuation (McGraw-Hill*, 1965), the teachings of which are incorporated herein by reference, scalar and vector displacement potential functions can be derived as solutions to the elastic wave equation, subject to the boundary conditions imposed by the model of FIG. 8. From these potential functions, the pressure and particle velocity waves which will strike detectors 22 can be determined.

Using Whites' method, the following expressions are obtained for the pressure waves and particle velocity waves (in the-z direction) in the water:

$$p' = p'\omega^2 A_1'(e^{im'z})(e^{-ilx})(e^{i\omega t})$$

$$v' = \omega^2((1/\omega'^2) - (1/c^2))^{\frac{1}{2}} A_1'(e^{im'z}(e^{-ilx})(e^{i\omega t})) \quad \text{[Eq. 3-1]}$$

where $A_1'$ = displacement potential amplitude $$m' = \omega((1/\omega'^2) - (1/c^2))^{\frac{1}{2}}$$

$$l = /107/c$$

$$c = \alpha'/\sin\gamma_p'$$

Substituting the location of the detectors (x=0, z=$-z_d$) into the above expressions, $$p' = p'\omega^2 A_1' e^{i(\omega t - m'z_d)}$$

$$v' = \omega^2(1/\omega'^2) - (1/c^2))A_1' e^{i(\omega t - m'z_d)}$$

Recalling that $$m' = \omega((1/\omega'^2) - (1/c^2))^{\frac{1}{2}}$$

Substituting $$c = \omega'/\sin\gamma_p'$$

into the above expression, the following are obtained $$p' = p'\omega^2 A_1' e^{i\omega(t - (z_d/\omega')\cos\gamma_p')}$$

$$v' = (\omega^2/\alpha')\cos\gamma_p' A_1' e^{i\omega(t - (z_d/\alpha')\cos\gamma_p')} \quad \text{[Eq. 3-2]}$$

The scalar potential function yielding these expressions for p' and v' indicates that they are frequency-domain representations of Dirac delta functions occurring at time $$t = (z_d/\alpha')\cos\gamma_p'$$

They therefore correspond to the first arrivals of p(t) and v(t) of FIG. 5.

It will be appreciated that the ratio of v' and p' is $$v'/p' = \cos\gamma_p'/\rho'\alpha' \quad \text{[Eq. 3-3]}$$

which corresponds to the ratio of the amplitudes of the first arrivals of FIG. 5. The additional cosine factor accounts for the directivity of the velocity detector.

The expression relating p' in the water to the incident pressure wave p is $$p'/p = K_T$$

$$K_T = (2(\rho'c^4)/\rho\gamma^4)((c^2/\alpha^2)-1)^{\frac{1}{2}}/(A+B+C) \quad [\text{Eq. 3-4}]$$

where $$A = (\rho'c^4/\rho\gamma^4)((c^2/\alpha^2)-1)^{\frac{1}{2}}$$

$$B = ((c^2/\alpha'^2)-1)^{\frac{1}{2}}((c^2/\gamma^2)-2)^2$$

$$C = 4((c^2/\alpha^2)-1)^{178}((c^2/\alpha^2)-1)^{\frac{1}{2}}((c^2/\gamma^2)-1)^{\frac{1}{2}}$$

For normal incidence ($c \to \infty$), this expression reduces to the transmission coefficient T described above.

For the Hard water-bottom, the following velocity relationships apply:

$$\alpha >= \beta >= \alpha'$$

For $$|c| >= \alpha >= \beta >= \alpha'$$

the ranges of angles for the various reflected and refracted waves can be calculated. The results are $$0 <= \gamma_p <= 90°$$

$$0 <= \gamma_s <= \sin^{-1}(\beta/\alpha) = 33.8°$$

$$0 <= \gamma_p' <= \sin^{-1}(\alpha'/\alpha) = 19.5°$$

and the expressions of [Eq. 3-1]-[Eq. 3-4] also apply to the Hard water-bottom case.

The velocity relationships for the Soft water-bottom case are $$\alpha' >= \alpha >= \beta$$

and for $$|c| >= \alpha' >= \alpha >= \beta$$

all the preceding expressions also apply.

The ranges of the angles for this condition are:

$$0 <= \gamma_p <= \sin^{-1}(\alpha/\alpha') = 53.1°$$

$$0 <= \gamma_s <= \sin^{-1}(\beta/\alpha') = 13.0°$$

$$0 <= \gamma_p' <= \sin^{-1}(\alpha'/\alpha') = 90°$$

At this point, expressions for p(t) and v(t) corresponding to those of [Eq. 2-1] can be written as follows.

$$p(t) = K_t \delta(t - (z_d/\alpha')\cos\gamma_p')$$

$$v(t) = (K_T\cos\gamma_p'/\rho'\alpha')\delta(t - (z_d/\alpha')\cos\gamma_p') \quad Eq.\ 3\text{-}5]$$

where $K_T$ is given in Eq. 3-4]

Figure 9:
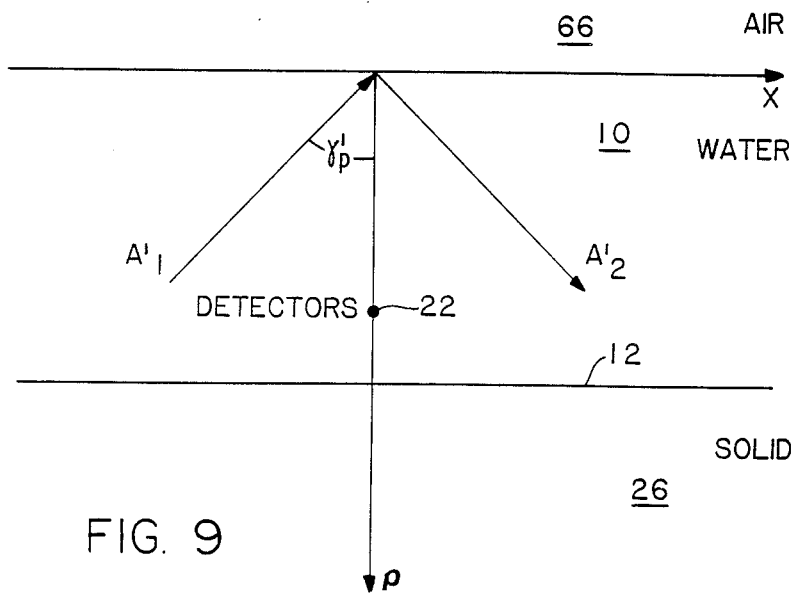

In the model, an upward-propagating reflection wave has encountered the detectors 22 at $z = -z_d$ and is preparing to strike the air/water interface. This is depicted in FIG. 9 where, it will be noted, the origin of the coordinate system has been shifted to the surface of the water.

Solving the elastic wave equation subject to the boundary conditions imposed by this model, it is found that $$A_2' = -A_1'$$

and $$p' = \rho'\omega^2(A_1'e^{im'\zeta} - A_1'e^{-im'\zeta})e^{-ilx}e^{i\omega t}$$

$$v' = \omega^2((1/\alpha'^2)-(1/c^2))(A_1'e^{im'\zeta}+A_1'e^{-im'\zeta})e^{-ilx}e^{i\omega t}$$

$$m' = \omega((1/\alpha'^2)-(1/c^2))^{\frac{1}{2}}$$

$$l = \omega/c$$

$$c = \alpha'/40/\sin\gamma_p'$$

Substituting the position of our detectors ($o_1\zeta_d$), and $c = \alpha'/\sin\gamma_p'$ into the above expressions, $$p' = \rho'\omega^2 A_1'e^{iw(t+(\zeta d/\alpha')\cos\gamma_p')}$$

$$-\rho'\omega^2 A_1'e^{iw(t-(\zeta d/\alpha')\cos\gamma_p')}$$

$$v' = (\cos\gamma_p'/\alpha')\omega^2 A_1'e^{iw(t+(\zeta d/\alpha')\cos\gamma_p')}$$
$$+\cos\gamma_p'/\alpha')\omega^2 A_1'e^{iw(t-(\zeta d/\alpha')\cos\gamma_p')} \quad [\text{Eq. 3-6}]$$

It will be noted that the first term of p' and v' each represent a wave traveling in the $-\zeta$ direction (upward) and the second term a wave traveling in the $+\zeta$ direction (downward). It will also be noted that they are again frequency-domain representations of Dirac delta functions.

The total time delay between the arrival of the above waves at our detectors is $$\Delta t = (2\zeta_d/\alpha')\cos\gamma_p'$$

To relate this to the coordinate system of FIG. 8, note that $$\zeta = z + d$$

Therefore $$\zeta_d = -z_d + d$$

and substituting above, $$\Delta t = (2d - 2z_d/\alpha')\cos\gamma_p'$$

This represents the delay time between the arrival of the reflection of [Eq. 3-5] and the water surface ghost. Therefore, adding the time-domain representation of the downward-propagating components of [Eq. 3-6] to [Eq. 3-5] we obtain $$p(t) = K_T\delta(t-(z_d/\alpha')\cos\gamma_p')$$
$$-K_T\delta(t-((2d-z_d)/\alpha')\cos\gamma_p')$$

$$v(t) = (K_T\cos\gamma_p'/\rho'\alpha')\delta(t-(z_d/\alpha')\cos\gamma_p')$$
$$+(K_T\cos\gamma_p'/\rho'\alpha')\delta(t-((2d-z_d)/\alpha')\cos\gamma_p') \quad [\text{Eq. 3-7}]$$

Figure 10:
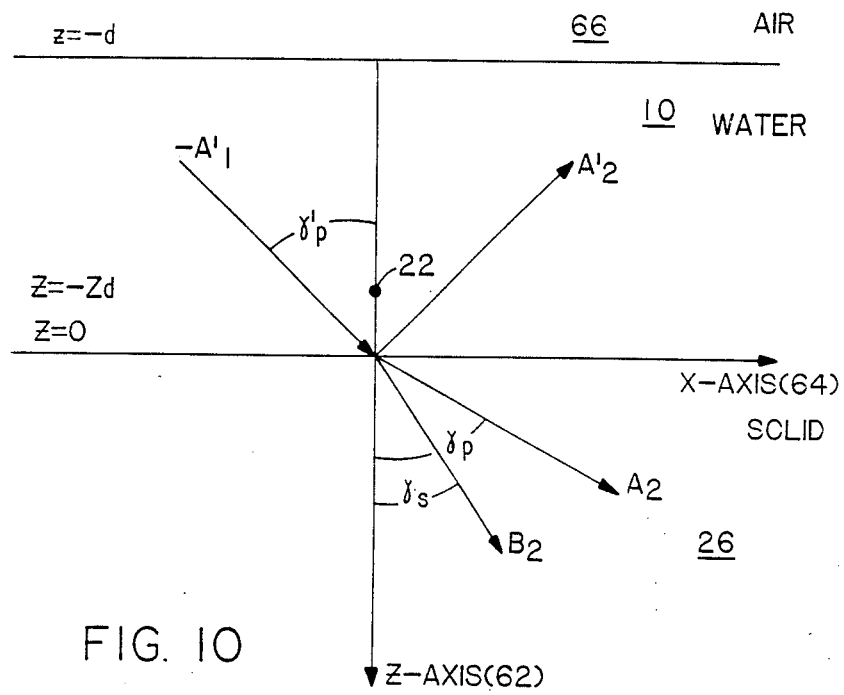

The downward-propagating wave is now ready to strike the water-bottom and to be partially reflected back toward our detectors. This model is shown in FIG. 10.

Once again, solving the elastic wave equation, $$p' = \rho'\omega^2(-A_2'e^{im'z} - A_1'e^{-im'z})e^{-ilx}e^{i\omega t}$$

$$v' = \omega^2((1/\alpha'^2)-(1/c^2))$$
$$(-A_2'e^{im'z}+A_1'e^{-im'z})e^{-ilx}e^{i\omega t}$$

Substituting for the position of the detectors 22

$$p' = -\rho'\omega^2 A_2' e^{i\omega(t-(z_d/\alpha')\cos\gamma_p')}$$
$$\quad -\rho'\omega^2 A_1' e^{i\omega(t+(z_d/\alpha')\cos\gamma_p')}$$

$$v' = (-\cos\gamma_p'/\alpha')\omega^2 A_2' e^{i\omega(t-(z_d/\alpha')\cos\gamma_p')}$$
$$\quad + (\cos\gamma_p'/\alpha')\omega^2 A_1' e^{i\omega(t+(z_d/\alpha')\cos\gamma_p')} \quad \text{[Eq. 3-8]}$$

Here, the first term of p' and v' each represents the upward-propagating wave and the second term the downward. The time delay between the arrival of the two waves at our detectors is $$\Delta t = (2z_d/\alpha')\cos\gamma_p'$$

Updating p(t) and v(t) in [Eq 3-7] yields $$p(t) = K_T\delta(t - (z_d/\alpha')\cos\gamma_p') - \quad \text{[Eq. 3-9]}$$
$$\quad K_T\delta(t - ((2d - z_d)/\alpha')\cos\gamma_p') -$$
$$\quad K_R K_T\delta(t - ((2d + z_d)/\alpha')\cos\gamma_p') + \ldots$$

$$v(t) = (K_T\cos\gamma_p'/\rho'\alpha')\delta(t - (z_d/\alpha')\cos\gamma_p') +$$
$$\quad (K_T\cos\gamma_p'/\rho'\alpha')\delta(t - ((2d - z_d)/\alpha')\cos\gamma_p') -$$
$$\quad (K_R K_T\cos\gamma p'/\rho'\alpha')\delta(t - ((2d + z_d)/\alpha')\cos\gamma_p') + \ldots$$

where $$K_R A_2'/A_1'$$

The value of $K_R$ depends upon the water-bottom material and the angle of incidence as normal:

NORMAL WATER-BOTTOM

For the condition $$|c| > = \alpha > = \alpha' > = \beta$$

where $c = (\alpha/\sin\gamma_p) = (\alpha'/\sin\gamma_p') = (\beta/\sin\gamma_s)$ $$0 < = \gamma_p' < = \sin^{-1}(\alpha'/\alpha) = 61.9°$$

$$K_R = (-A + B + C)/(A + B + C) \quad \text{[Eq. 3-10]}$$

where $$A = (\rho'c^4/\rho\beta^4)((c^2/\alpha^2) - 1)^{\frac{1}{2}}$$

$$B = ((c^2/\alpha'^2) - 1)^{\frac{1}{2}}((c^2/\beta^2) - 2)^2$$

$$C = 4((c^2/\alpha'^2) - 1)^{\frac{1}{2}}((c^2\alpha^2) - 1)^{\frac{1}{2}}((c^2\beta^2) - 1)^{\frac{1}{2}}$$

For $$\alpha > = |c| > = \alpha' > = \beta$$

$$61.9° < = \alpha_p < = 90°$$

$$K_R = (-A + B)\text{sgn}\omega + iC/(A + B)\text{sgn}\omega + iC \quad \text{[Eq. 3-11]}$$

where $$A = (\rho'c^4/\rho\beta^4)(1 - (c^2/\alpha^2))^{\frac{1}{2}}$$

$$B = 4((c^2/\alpha'^2) - 1)^{\frac{1}{2}}(1 - (c^2/\alpha^2))^{\frac{1}{2}}((c^2/\beta^2) - 1)^{\frac{1}{2}}$$

$$C = ((c^2/\alpha'^2) - 1)^{\frac{1}{2}}((c^2/\beta^2) - 2)^2$$

HARD WATER-BOTTOM

For the condition $$|c| > = \alpha > = \beta > = \alpha'$$

$$0 < = \gamma_p' < = \sin^{-1}(\alpha'/\alpha) = 19.5°$$

$K_R$ is given by [Eq. 3-10]
For $$\alpha > = |c| > = \beta > = \alpha'$$

$$19.5° < = \gamma_p' < = \sin^{-1}(\alpha'/\beta) = 36.9°$$

$K_R$ is given by [Eq. 3-11]
For $$\alpha > = \beta > = |c| > = \alpha'$$

$$36.9° < = \gamma_p' < = 90°$$

$$K_R = A + i(-B + C)/-A + i(-B + C) \quad \text{[Eq. 3-12]}$$

where $$A = (\rho'c^4/\rho\beta^4)(1 - (c^2/\alpha^2))^{\frac{1}{2}}\text{sgn}\omega$$

$$B = ((c^2/\alpha'^2) - 1)^{\frac{1}{2}}((c^2/\beta^2) - 2)^2$$

$$C = 4((c^2/\alpha'^2) - 1)^{\frac{1}{2}}(1 - (c^2/\alpha^2))^{\frac{1}{2}}(1 - (c^2/\beta^2))^{\frac{1}{2}}$$

SOFT WATER-BOTTOM

For the condition $$|c| > = \alpha' > = \alpha > = \beta\text{ps } 0 < = \gamma_p' < = 90°$$

$K_R$ is given by [Eq. 3-10]

Figure 11:
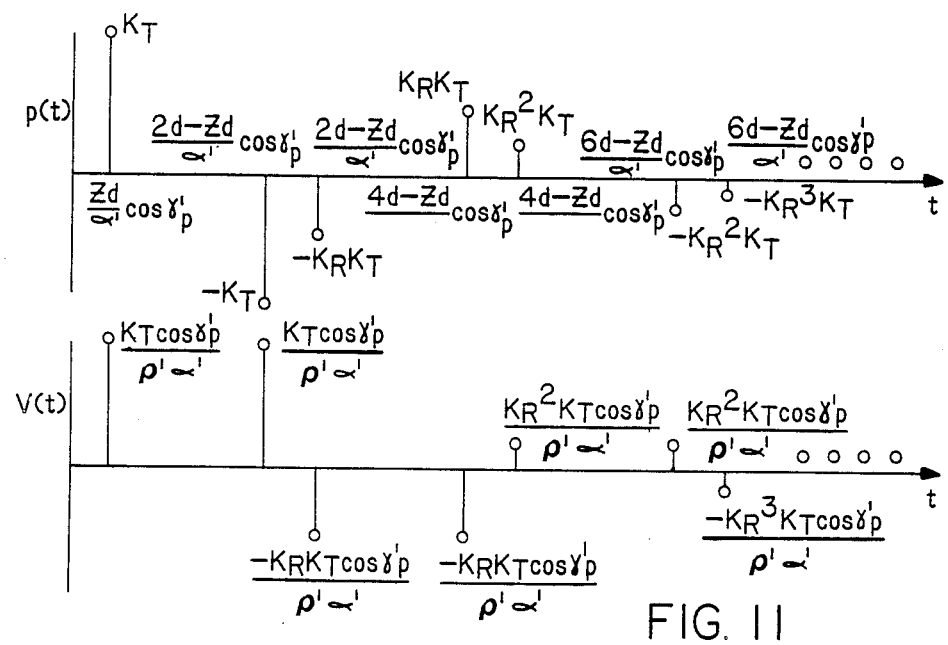
FIG. 11 depicts pressure and velocity waveforms arriving at a detector shown in FIGS. 8–10.

Referring back to the expressions for p(t) and v(t) in [Eq. 3-9] and comparing them to FIG. 5, those skilled in the art will readily appreciate how to modify the signals of FIG. 5 to account for non-vertical incidence. An illustration so modified is shown in FIG. 11. In that figure, it can be seen that to cancel all downward-propagating waves, v(t) must be scaled by $(\rho'\alpha'/\cos\gamma_p')$ and added to p(t).

$$s(t) = p(t) + (\rho'\alpha'/\cos\gamma_p')v(t)$$

$$s(t) = 2K_T\delta(t - (z_d/\alpha')\cos\gamma_p') - 2K_R K_T\delta(t - ((2d+z_d)/\alpha')\cos\gamma_p') + 2K_R^2 K_T\delta(t - ((4d+z_d)/\alpha')\cos\gamma_p') \quad \text{[Eq. 3-13]}$$

Figure 12:
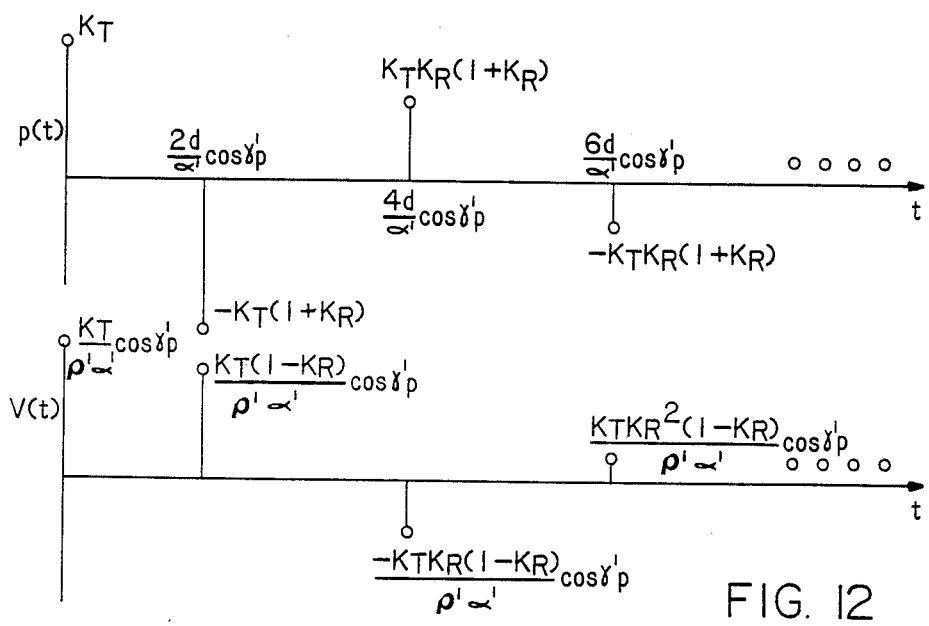
FIG. 12 depicts the waveforms of FIG. 11 modified for detectors placed on the water bottom.

Assuming, once again, that the detectors 22 are placed at the water-bottom ($z_d = 0$), the signals of FIG. 11 are modified as shown in FIG. 12. Here, it is also seen that all water-column reverberations may be eliminated through proper choice of a scale factor. More particularly, this can be accomplished if v(t) is scaled as shown below and add it to p(t).

$$s(t) = p(t) + (\rho'\alpha'/\cos\gamma_p')((1 + K_R)/(1 - K_R))v(t)$$

$$s(t) = K_T\{1 + ((1 + K_R)/(1 - K_R))\}\delta(t) \quad \text{[Eq. 3-14]}$$

As above, the scale factor required for v(t) involves the reflection coefficient of the water-bottom, and, therefore, its acoustic impedance. Methods for determining that scale factor are discussed in detail above.

SUMMARY

Described above is a marine seismic prospecting system for attenuating coherent noise by scaling and summing the outputs of adjacently positioned pressure and particle velocity detectors.

In embodiments where those sensors are disposed above the water bottom, the system advantageously removes downwardly propagating components of the reverberations by multiplying the velocity function by $$(\rho'\alpha'/\text{Dir}_{corr})*(G_p/G_v)$$

where $\rho'$ is a density of the water; $\alpha'$ is a velocity of propagation of the seismic wave in the water $G_p$ is a transduction constant associated with the water pressure detecting step (e.g., a transduction constant of the transducer with which the water pressure is recorded); $G_v$ is a transduction constant associated with the water velocity detecting step (e.g., a transduction constant of the transducer with which the particle velocity is detected); and $\text{Dir}_{corr}$ is equal to $\cos(\gamma_p')$ for $\gamma_p$. less than a selected critical angle and, otherwise, is equal to 1; and where the critical angle is equal to $\arcsin(\alpha'/\alpha)$, where ($\alpha$) is a velocity of propagation of the seismic wave in an earth material at said water's bottom.

In embodiments where those sensors are disposed on the water bottom, the system advantageously removes both downwardly and upwardly components of the reverberations by multiplying the velocity function by $$(\rho\alpha/\text{Dir}_{corr})*(G_p/G_v)$$

where ($\rho$) is the density of the earth material at the water's bottom; and ($\alpha$) and $\text{Dir}_{corr}$, $G_p$ and $G_v$ are defined as above.

The scale factor used in a marine seismic reflection prospecting system constructed according to the invention can be determined statistically or deterministically. The former involves determining the ratio of a selected lag of the autocorrelation of the water pressure to a selected lag of crosscorrelation of the water pressure and water velocity at selected lag values. Preferably, however, the statistical determination involves computing the ratio of the autocorrelation of the water pressure at selected lag to the autocorrelation of the water velocity at a selected lag. The selected lags can correspond, for example, to a time of two-way travel of seismic wave through said water between the Position at which the pressure and velocity detectors reside and the water's surface. Preferably, however, the selected lags are zero.

Derivation of the scale factor deterministically involves generating a pressure wave from a position above the sensor point (i.e., the point at which the pressure and particle velocity readings are taken during seismic data collection). The scale factor can then be derived from the ratio of the absolute values of the pressure and particle velocity magnitudes at the sensor point during selected arrivals, e.g., the first, of that pressure wave.

Those skilled in the art will appreciate that the signal processing functions described above—particularly, for example, with reference to FIGS. 2 and 7 hereof—can be implemented in special purpose hardware. Preferably, however, those functions are implemented using a general purposed digital data processing apparatus operating a seismic data processing software package. Several such software packages are commercially available, including one marketed under the mark "TIPEX" by the assignee hereof.

Those skilled in the art will appreciate that a marine seismic reflection prospecting system as described hereinabove does not utilize a filtering mechanism for changing the frequency output of pressure and/or velocity detectors of the type disclosed in the Ruehle Patent, U.S. Pat. No. 4,486,865. More particularly, it will be appreciated that the system described hereinabove does not include a filter element using a minimum phase deconvolution operator having a predetermined amount of white noise added to the zero lag of the autocorrelation.

Further, whereas the above-described scale factor is preferably multiplied by the measured particle velocity function, those skilled in the art will appreciate that the measured pressure function could, instead, be multiplied by a factor directly related to that scale factor and the particle velocity function could be multiplied by one. It will further be appreciated that both signals could be multiplied by factors directly related to the scale factor.

Further, whereas the illustrated embodiments were described with respect to marine bottom cable operations, the invention is equally applicable to marine-based inverse VSP operations.

These and other such modifications are contemplated to fall within the scope of the invention.

Accordingly, what I claim is:

1. An improved seismic reflection method for geophysical prospecting in water covered areas, comprising the steps of
   A. generating a seismic wave for reflection from earth strata,
   B. detecting water pressure at a first position in the water resulting from said seismic wave and generating a signal representative thereof,
   C. detecting water velocity at a position substantially near said first position resulting from said seismic wave and generating a signal representative thereof, and
   D. generating an enhanced seismic reflection signal by multiplying at least one of said water pressure-representative signal and the water velocity-representative signal by a scale factor dependent upon an acoustical impedance of a substance through which said seismic wave travels, and by summing said scaled water velocity-representative and water pressure-representative signals, and enhanced seismic reflection signal being substantially free of at least downwardly-propagating components of reverberation of said seismic wave within the water.

2. A method according to claim 1, wherein said enhanced seismic reflection signal-generating step includes the steps of
   A. scaling said water velocity-representative and water pressure-representative signals by multiplying at least a selected one of them by a scale factor dependent upon an acoustical impedance of the water, and
   B. summing said scaled water velocity-representative and water pressure-representative signals to produce said enhanced seismic reflection signal.

3. A method according to claim 2, wherein said scaling step includes the step of multiplying said at least one selected signal by a value dependent upon $$\rho'\alpha'/\text{Dir}_{corr}$$

where $\rho'$ is a density of the water, $\alpha'$ is a velocity of propagation of the seismic wave in the water, and $\text{Dir}_{corr}$ is a directivity correction factor.

4. A method according to claim 3, wherein said scaling step includes the step of multiplying said at least one selected signal by a value dependent upon $$(\rho'\alpha'/\text{Dir}_{coor})*(G_p G_v)$$

where $G_p$ is a transduction constant associated with the water pressure detecting step, and $G_v$ is a transduction constant associated with the water velocity detecting step.

5. A method according to claim 3, wherein said scaling step includes the step of determining said directivity correction factor, $\text{Dir}_{corr}$, to be equal to one.

6. A method according to claim 3, wherein said scaling step includes the step of determining said directivity correction factor $\text{Dir}_{corr}$, to be equal to $\cos(\gamma_p')$, whee $\gamma_p'$ is an angle of propagation from vertical of the seismic wave in water.

7. A method according to claim 4, wherein said scaling step includes the step of generating said directivity correction factor, $\text{Dir}_{corr}$, to be equal to $\cos(\gamma_p')$ for $\gamma_p'$ less than a selected critical angle, and to otherwise be equal to 1, where $\gamma_p'$ is an angle of propagation from vertical of the seismic wave in the water.

8. A method according to claim 7, wherein said scaling step includes the step of determining said critical angle to be substantially equal to $\arcsin(\alpha'/\alpha)$, where $\alpha'$ is the velocity of propagation of the seismic wave in the water and $\alpha$ is a velocity of propagation of the seismic wave in an earth material at said water's bottom.

9. A method according to claim 2, wherein said scaling step includes the step of multiplying said water velocity-representative signal by $(G_p/G_v)*\rho'\alpha'$ 10. A method according to claim 1, comprising the step of positioning a pressure detector and a velocity detector substantially near water's bottom for detecting said water pressure and said water velocity and for generating signals representative thereof, respectively.

11. A method according to claim 10, wherein said enhanced seismic reflection signal-generating step includes the steps of
A. scaling said water velocity-representative and water pressure-representative signals by multiplying at least a selected one of them by a scale factor dependent upon an acoustical impedance of a solid earth material at said water's bottom,
B. summing said scaled water velocity-representative and water pressure-representative signals to produce said enhanced seismic reflection signal, said enhanced seismic reflection signal being substantially free of downwardly-propagating and upwardly-propagating components of reverberation of said seismic wave within the water.

12. A method according to claim 11, wherein said scaling step includes the further step of multiplying said at least one selected signal by a value dependent upon $\rho\alpha/\text{Dir}_{corr}$ where
$\rho$ is a density of said solid earth material, $\alpha$ is a velocity of propagation of the seismic wave in said solid earth material, and $\text{Dir}_{corr}$ is a directivity correction factor.

13. A method according to claim 12, wherein said scaling step includes the step of multiplying said at least one selected signal by a value dependent upon $(\rho\alpha/\text{Dir}_{corr})*(G_p/G_v)$ where $G_p$ is a transduction constant associated with the water pressure detecting step, and $G_v$ is a transduction constant associated with the water velocity detecting step.

14. A method according to claim 13, wherein said scaling step includes the step of generating said directivity correction factor, $\text{Dir}_{corr}$, to be equal to $\cos(\gamma_p')$ for $\gamma_p'$ less than a selected critical angle, and to otherwise be equal to 1, where $\gamma_p'$ is an angle of propagation from vertical of the seismic wave in the water.

15. A method according to claim 14, wherein said scaling step includes the step of determining said critical angle to be substantially equal to $\arcsin(\alpha'/\alpha)$, where $\alpha'$, is the velocity of propagation of the seismic wave in the water and $\alpha$ is a velocity of propagation of the seismic wave in said solid earth material at said water's bottom.

16. A method according to claim 12, wherein said scaling step includes the step of determining said directivity correction factor, $\text{Dir}_{corr}$, to be equal to one.

17. A method according to claim 12, wherein said scale factor-determining step includes the step of dividing said ratio-dependent scale factor by $(G_p/G_v)*\rho\alpha.$ 18. A method according to claim 11, wherein said scaling step includes the step of multiplying said water velocity-representative signal by $(G_p/G_v)*\rho\alpha.$ 19. A method according to claim 11, including the step of determining said scale factor statistically.

20. A method according to claim 19, wherein said scale factor-determining step includes the steps of
A. computing an autocorrelation of said water pressure-representative signal at a selected lag value and generating a signal representative thereof,
B. computing an autocorrelation of said water particle velocity-representative signal at a selected lag value and generating a signal representative thereof,
C. determining said scale factor as dependent on a ratio of said water pressure autocorrelation-representative signal to said water particle velocity autocorrelation-representative signal.

21. A method according to claim 20 wherein said scale factor-determining step includes the step of determining said scale factor as dependent on a ratio of said water pressure autocorrelation-representative signal to said water particle velocity autocorrelation-representative signal at zero lag.

22. A method according to claim 20 wherein said scale factor-determining step includes the step of determining said scale factor as dependent on a ratio of said water pressure autocorrelation-representative signal to said water particle velocity autocorrelation-representative signal at selected lags corresponding to a time of two-way travel of said seismic wave through said water.

23. A method according to claim 22, wherein said scale factor-determining step includes the step of taking the square root of said ratio-dependent scale factor.

24. A method according to claim 19, wherein said scale factor-determining step includes the steps of:
A. computing an autocorrelation of said water pressure-representative signal and generating a signal representative thereof,
B. computing a crosscorrelation of said water pressure-representative signal and said water velocity-representative signal and generating a signal representative thereof, and C. determining said scale factor as dependent on a ratio of said autocorrelation-representative signal at a Selected lag value and said crosscorrelation-representative signal a selected lag value.

25. A method according to claim 24 wherein said scale factor-determining step includes the step of determining said scale factor as dependent on a ratio of said autocorrelation-representative signal and said crosscorrelation-representative signal, both at selected legs corresponding to a time of two-way travel of said seismic wave through said water.

26. A method according to claim 11, including the step of determining said scale factor deterministically.

27. A method according to claim 26, where said scale factor determining step includes the steps of
   A. generating a pressure wave from a position above the position of said pressure and velocity detectors,
   B. detecting, with said water pressure detector, water pressure during a selected arrival of said pressure wave and generating a signal representative thereof,
   C. detecting, with said velocity detector, a signal representative of water velocity during a selected arrival of said pressure wave and generating a signal representative thereof, and
   D. determining said scale factor as dependent on a ratio of the absolute values of the magnitudes of the pressure wave velocity-representative signal and the pressure wave pressure-representative signal.

28. A method according to claim 27, wherein said pressure wave-generating step includes the step of generating said pressure wave from a position directly over said pressure and velocity detectors.

29. A method according to claim 28, wherein
   A. said pressure wave pressure detecting step includes the step of detecting water pressure during a first arrival of said pressure wave, and
   B. said pressure wave velocity detecting step includes the step of detecting water velocity during a first arrival of said pressure wave.

30. A method according to claim 11, including the step determining said scale factor by iteratively performing said scaling and summing steps with one or more candidate scale factors, stacking the resultant enhanced seismic reflection signals and determining said scale factor to be a candidate factor which minimizes the effect of water column reverberations.

31. An improved seismic reflection method for geophysical prospecting in water covered areas,
   said method being free of filter means including a deconvolution operation for changing the frequency content of any one of pressure-detecting and velocity-detecting elements,
   said method comprising the steps of
      A. generating a seismic wave for reflection from earth strata,
      B. positioning a pressure detector and a velocity detector substantially near water's bottom for detecting said water pressure and said water velocity and for generating signals representative thereof,
      C. detecting water velocity at a position substantially near the position of said pressure detector resulting from said seismic wave and generating a signal representative thereof, and
      D. generating an enhanced seismic reflection signal as a selected linear combination of said water pressure representative signal and the water velocity-representative signal, said enhanced seismic reflection signal being substantially free of at least downwardly-propagating components of reverberation of said seismic wave within the water, said enhanced seismic reflection signal-generating step includes the steps of
         i. scaling said water velocity-representative and water pressure-representative signals by multiplying at least a selected one of them by a scale factor dependent upon an acoustical impedance of a solid earth material at said water's bottom,
         ii. summing said scaled water velocity-representative and water pressure-representative signals to produce said enhanced seismic reflection signal, said enhanced seismic reflection signal being substantially free of downwardly-propagating and upwardly-propagating components of reverberation of said seismic wave within the water.

32. A method according to claim 31, including the step of determining said scale factor statistically.

33. A method according to claim 32, wherein said scale factor-determining step includes the steps of:
   A. computing an autocorrelation of said water pressure-representative signal and generating a signal representative thereof,
   B. computing a autocorrelation of said water pressure-representative signal and said water velocity-representative signal and generating a signal representative thereof, and
   C. determining said scale factor as dependent on a ratio of said autocorrelation-representative signals at a selected leg value.

34. A method according to claim 31, including the step of determining said scale factor deterministically.

35. A method according to claim 34, wherein said scale factor determining step includes the steps of
   A. generating a pressure wave from a position above the position of said pressure and velocity detectors,
   B. detecting, with said water pressure detector, water pressure during a selected arrival of said pressure wave and generating a signal representative thereof,
   C. detecting, with said velocity detector, a signal representative of water velocity during a selected arrival of said pressure wave and generating a signal representative thereof, and
   D. determining said scale factor as dependent on a ratio of the absolute values of the magnitudes of the pressure wave velocity-representative signal and the pressure wave pressure-representative signal.

36. An improved system for seismic reflection prospecting in water covered areas,
   said system being free of filter means including a deconvolution operation for changing the frequency content of any one of pressure-detecting an velocity-detecting elements,
   said system comprising
      A. means for generating a seismic wave for reflection from earth strata,
      B. Pressure detection means disposed substantially near a bottom of said water for detecting a pressure associated with a resultant seismic wave and for generating signals representative thereof,
      C. particle velocity detection means disposed at a position substantially near said pressure detection means for detecting a particle velocity associated with said resultant seismic wave and generating a signal representative thereof, and D. enhanced seismic reflection means coupled with said pressure detection means and said particle velocity means for generating an enhanced seismic reflection signal as a selected linear combination of said water pressure-representative signal and the water velocity-representative signal, said enhanced seismic reflection signal being substantially free of at least downwardly-propagating components of reverberation of said seismic wave within the water, said enhanced seismic reflection means including
   i. means for multiplying at least a selected one of said pressure-representative and water velocity-representative signals by a scale factor dependent upon an acoustical impedance of a solid earth material at said water's bottom,
   ii. means for summing said scaled water velocity-representative and water pressure-representative signals to produce said enhanced seismic reflection signal, said enhanced seismic reflection signal being substantially free of downwardly-propagating and upwardly-propagating components of reverberation of said seismic wave within the water.

37. A system according to claim 36, comprising means for determining said scale factor statistically.

38. A system according to claim 37, wherein said scale factor-determining means includes:
   A. means for computing an autocorrelation of said water pressure-representative signal at a selected lag value and generating a signal representative thereof,
   B. means for computing an autocorrelation of said water velocity-representative signal at a selected lag value and generating a signal representative thereof, and
   C. means for determining said scale factor as dependent on a ratio of said pressure autocorrelation-representative signal to said velocity autocorrelation-representative signal.

39. A system according to claim 36, including means for determining said scale factor deterministically.

40. A system according to claim 39, where said scale factor-determining means includes
   A. means for generating a pressure wave from a position above the position of said pressure and velocity detectors,
   B. means for detecting, with said water pressure detector, water pressure during a selected arrival of said pressure wave and generating a signal representative thereof,
   C. means for detecting, with said velocity detector, a signal representative of water velocity during a selected arrival of said pressure wave and generating a signal representative thereof, and
   D. means for determining said scale factor as dependent on a ratio of the absolute values of the magnitudes of the pressure wave velocity-representative signal and the pressure wave pressure-representative signal.

* * * * *

UNITED STATES PATENT AND TRADEMARK OFFICE
CERTIFICATE OF CORRECTION

PATENT NO. : 4,979,150

DATED : December 18, 1990

INVENTOR(S) : Frederick J. Barr

It is certified that error appears in the above-identified patent and that said Letters Patent is hereby corrected as shown below:

In Column 5, Line 42, delete the " P' " and insert therefore --ρ'--

In Column 6, Line 10, before the equation insert therefore -- K= --

In Column 7, Line 58, the letter P in the word positioned should be lower

In Column 9, Line 17, after the word cube, insert therefore -- . --

In Column 9, Line 60, between the z and $\alpha$, delete the " + " and insert -- / --, In Column 10, Line 1, the equation "$\partial v_u/\partial t=(1/\rho)(\partial p_u/\partial z)=)1/\rho\alpha)\delta'(t+(z/\alpha))$" should read --$\partial v_u/\partial t=(1/\rho)(\partial p_u/\partial z)=(1/\rho\alpha)\delta'(t+(z/\alpha))$--,

UNITED STATES PATENT AND TRADEMARK OFFICE
CERTIFICATE OF CORRECTION

PATENT NO. : 4,979,150

DATED : December 18, 1990

INVENTOR(S) : Frederick J. Barr

It is certified that error appears in the above-identified patent and that said Letters Patent is hereby corrected as shown below:

In Column 10, Line 16, the equation "$v_u=(1/\rho a)\delta(t+(z/a)$" should read --$v_u=(1/\rho\alpha)\delta(t+(z/a))$--, In Column 10, Line 20, the equation "$v_d=(1/\rho\alpha)\delta(t-(z/\alpha))$" should read --$v_d=-(1/\rho\alpha)\delta(t-(z/\alpha))$--, In Column 10, Line 45, the equation "$P_d=R'\delta(t-(z/a))$" should read --$p_d=R'\delta(t-(z/a))$--,
10.
In Column 10, Line 47, the equation "$R'=(\rho'\alpha'-\rho\alpha)/(\rho'\alpha'+'\alpha)$" should read --$R'=(\rho'\alpha'-\rho\alpha)/(\rho'\alpha'+\rho\alpha)$--, In Column 11, Line 11, the equation "$p(t)=T\delta(t\delta(t-(z_d/\alpha'))$" should read --$p(t)=T\delta(t-(z_d/\alpha'))$--, as set forth on Page 26, Line 7, of the Specification.

col. 11, line 47, "$t=(2t-z_d ya'$" to --$t=(2d-z_d ya'$--;

UNITED STATES PATENT AND TRADEMARK OFFICE
CERTIFICATE OF CORRECTION

PATENT NO. : 4,979,150
DATED : December 18, 1990
INVENTOR(S) : Frederick J. Barr It is certified that error appears in the above-identified patent and that said Letters Patent is hereby corrected as shown below:

In Column 11, Line 54, the equation
"$v(t)=)T/\rho'\alpha')\delta(t-(z_d/\alpha'))+(T/\rho'\alpha')\delta(t-((2d-z_d)/\alpha'))$" should read
--$v(t)=(T/\rho'\alpha')\delta(t-(z_d/\alpha'))+(T/\rho'\alpha')\delta(t-((2d-z_d)/\alpha'))$--, In Column 12, Line 15, the equation
"$p(t)=T\delta(z_d/\alpha'))-T\delta(t-((2d-z_d)/\alpha'))-RT\delta(t-((2d+z_d)/\alpha'))$" should read
--$p(t)=T\delta(t-(z_d/\alpha'))-T\delta(t-((2d-z_d)/\alpha'))-RT\delta(t-((2d+z_d)/\alpha'))$--, In Column 12, Line 32, the equation
"$+2R^2T\delta(t-((4d-31z_d)/a'))-31...$" should read
--$+2R^2T\delta(t-((4d-z_d)/a'))-...$--, In Column 12, Line 35, the word "Propagating" should begin with lower case p, In Column 12, Line 57, the equation "$s(t)=T\}1+((1+R)/(1-R))\}\delta(t)$" should read --$s(t)=T\{1+((1+R)/(1-R))\}\delta(t)$--, In Column 12, Line 65 and 66, the equation
"$K=\rho'\alpha'(\rho\alpha+\rho'\alpha'+\rho\alpha-\rho'\alpha')/(\rho\alpha+\rho'\alpha'-\rho\alpha+\rho-\rho\alpha+\rho'\alpha')$" should read
--$K=\rho'\alpha'(\rho\alpha+\rho'\alpha'+\rho\alpha-\rho'\alpha')/(\rho\alpha+\rho'\alpha'-\rho\alpha+\rho'\alpha')$--, as set forth on

UNITED STATES PATENT AND TRADEMARK OFFICE
CERTIFICATE OF CORRECTION

PATENT NO. : 4,979,150

DATED : December 18, 1990

INVENTOR(S) : Frederick J. Barr

It is certified that error appears in the above-identified patent and that said Letters Patent is hereby corrected as shown below:

In Column 13, Line 17, the equation "$s(t)=2t\delta(t)-2RT\delta(t-(2d/\alpha'))$" should read --$s(t)=2T\delta(t)-2RT\delta(t-(2d/\alpha'))$--, In Column 13, Line 68, the equation
"$\Phi_{pp}(\pm 2d/\alpha')=T^2\}-(1+R)-R(1+R)^2-R^3(1+R)^2-...\}$"
--$\Phi_{pp}(\pm 2d/\alpha')=T^2\{-(1+R)-R(1+R)^2-R^3(1+R)^2-...\}$--, In Column 14, Line 1, the equation
"$\Phi_{pv}(2d/\alpha')=T^2\}(1-R)+R(1-R^2)+R^3(1-R^2)+...\}$" should read
--$\Phi_{pv}(2d/\alpha')=T^2\{(1-R)+R(1-R^2)+R^3(1-R^2)+...\}$--, In Column 14, Line 18, the equation
"$\Phi_{pp}(0)=T^2\}1+)1+R)^2+R^2(1+R)^2+R^4(1+R)^2+...\}$" should read
--$\Phi_{pp}(0)=T^2\{1+(1+R)^2+R^2(1+R)^2+R^4(1+R)^2+...\}$--, In Column 14, Line 21, the equation
"$\Phi_{vv}(0)=T^2\}1+(1-R)^2+R^2(1-R)^2+R^4(1-R)^2+...\}$" should read
--$\Phi_{vv}(0)=T^2\{1+(1-R)^2+R^2(1-R)^2+R^4(1-R)^2+...\}$--,

UNITED STATES PATENT AND TRADEMARK OFFICE
CERTIFICATE OF CORRECTION

PATENT NO. : 4,979,150
DATED : December 18, 1990
INVENTOR(S) : Frederick J. Barr It is certified that error appears in the above-identified patent and that said Letters Patent is hereby corrected as shown below:

In Column 14, Line 43, the equation
"$\Phi_{pp}(\pm 2d/\alpha')=T^2\}-(1+R)-R(1+R)^2-R^3(1+R)^2-...\}$" should read
--$\Phi_{pp}(\pm 2d/\alpha')=T^2\{-(1+R)-R(1+R)^2-R^3(1+R)^2-...\}$--, In Column 14, Line 60, the equation "$K=\}\Phi_{pp}(\pm 2d/\alpha')/\Phi_{vv}(\pm 2d/\alpha')\}^{\frac{1}{2}}$" should read --$K=[-\Phi_{pp}(\pm 2d/\alpha')/\Phi_{vv}(\pm 2d/\alpha')]^{\frac{1}{2}}$--, 26.
In Column 16, Line 9, the equation "$0<=\gamma_s<=\sin^{-1}(\gamma/a)=20.7°$" should read --$0<=\gamma_s<=\sin^{-1}(\beta/a)=20.7°$--, as set forth on Page 36, Line 26, of the Specification.

Col. 16, line 27 "$p'=p'w^2A_1'(e^{im'z})(e^{-ilx})(e^{fwt})$" to
--$p'=\rho'w^2A_1'(e^{im'z})(e^{-ilx})(e^{iwt})$--;

In Column 16, Line 29, the equation
"$v'=\omega^2((1/\omega'^2)-(1/c^2))^{\frac{1}{2}}A_1'(e^{im'z}(e^{-ilx})(e^{i\omega t})$" should read
--$v'=\omega^2((1/\alpha'^2)-(1/c^2))^{\frac{1}{2}}A_1'(e^{im'z})(e^{-ilx})(e^{i\omega t})$--, In Column 16, Line 32, the equation "$m'=\omega((1/\omega'^2)-(1/c^2))^{\frac{1}{2}}$" should read --$m'=\omega((1/\alpha'^2)-(1/c^2))^{\frac{1}{2}}$--,

UNITED STATES PATENT AND TRADEMARK OFFICE
CERTIFICATE OF CORRECTION

PATENT NO. : 4,979,150
DATED : December 18, 1990
INVENTOR(S) : Frederick J. Barr It is certified that error appears in the above-identified patent and that said Letters Patent is hereby corrected as shown below:

In Column 16, Line 35, the equation "$1=/107/c$" should read $--1=\omega/c--$,

In Column 16, Line 43, the equation
"$v'=\omega^2(1/\omega'^2)-(1/c^2))A_1 \cdot e^{i(\omega t - m'z_d)}$" should read
$--v'=\omega^2((1/\alpha'^2)-(1/c^2))A_1' e^{i(\omega t - m'z_d)}--$, In Column 16, Line 47, the equation "$m'=\omega((1/\omega'^2)-(1/c^2))^{1/2}$" should read
$--m'=\omega((1/\alpha'^2)-(1/c^2))^{1/2}--$, as set forth on Page 37, Line 32, of the Specification.

In Column 16, Line 51, the equation "$c=\omega'/\sin\gamma_p'$" should read
$--c=\alpha'/\sin\gamma_p'--$, as set forth on Page 38, Line 3, of the Specification.

Col. 16, line 55, "$zd/a'$" changed to $--z_d/a'--$;
col. 17, line 17, " "$C=4$ " change to $--\bar{C}=4--$;

In Column 17, Line 10, the equation "$K_T=(2(\rho'c^4)/\rho\gamma^4)((c^2/\alpha^2)-1)^{1/2}/(A+B+C)$"
should read $--K_T=(2(\rho'c^4)/\rho\beta^4)((c^2/\alpha^2)-1)^{1/2}/(A+B+C)--$, In Column 17, Line 13, the equation "$A=(\rho'c^4/\rho\gamma^4)((c^2/\alpha^2)-1)^{1/2}$" should read
$--A=(\rho'c^4/\rho\beta^4)((c^2/\alpha^2)-1)^{1/2}--$,

UNITED STATES PATENT AND TRADEMARK OFFICE
CERTIFICATE OF CORRECTION

PATENT NO. : 4,979,150

DATED : December 18, 1990

INVENTOR(S) : Frederick J. Barr

It is certified that error appears in the above-identified patent and that said Letters Patent is hereby corrected as shown below:

In Column 17, Line 15, the equation "$B=((c^2/\alpha'^2)-1)^{\frac{1}{2}}((c^2/\gamma^2)-2)^2$" should read --$B=((c^2/\alpha'^2)-1)^{\frac{1}{2}}((c^2/\beta^2)-2)^2$--, In Column 17, Line 65, after the word "in" insert therefore --[--, as set forth on Page 40, Line 30, of the Specification.

In Column 18, Line 16, the equation "$c=\alpha'/40/\sin\gamma_p'$"
--$c=\alpha'/\sin\gamma_p'$--, In Column 18, Line 24, the equation "$+\cos\gamma_p'/\alpha')\omega^2 A_1' e^{i\omega(t-(\zeta d/\alpha')\cos\gamma_p')}$" should read --$+(\cos\gamma_p'/\alpha')\omega^2 A_1' e^{i\omega(t-(\zeta d/\alpha')\cos\gamma_p')}$--, In Column 19, Line 3, the equation "$p'= -\rho'\omega^2 A_2' e^{i\omega(t-(z_d/\alpha')\cos\gamma_p')}$" should read --$p'= -\rho'\omega^2 A_2' e^{i\omega(t-(z_d/\alpha')\cos\gamma_p')}$--

UNITED STATES PATENT AND TRADEMARK OFFICE
CERTIFICATE OF CORRECTION

PATENT NO. : 4,979,150
DATED : December 18, 1990
INVENTOR(S) : Frederick J. Barr It is certified that error appears in the above-identified patent and that said Letters Patent is hereby corrected as shown below:

In Column 19, Line 4, the equation
" $-\rho' \omega^2 A_1' e^{i\omega(t-(z_d/\alpha')\cos\gamma_{p'})}$ " should read
-- $-\rho' \omega^2 A_1' e^{i\omega(t+(z_d/\alpha')\cos\gamma_{p'})}$ --

Col. 19, line 27 "$(K_R K_T$" changed to -- $-(K_R K_T$ --; and
Col. 20, line 50, "$(1-K_R)$" changed to --$(1-K_R))$-- (second occurrence).

In Column 19, Line 31, the equation "$K_R A_2'/A_1'$" should read --$K_R = A_2'/A_1'$--, In Column 19, Line 34, delete the word "normal" and insert therefore --follows--, In Column 19, Line 49, the equation "$B=((c^2/\alpha'^2)-1)^{1/2}((c^2/\beta^2))^2$" should read --$B=((c^2/\alpha'^2)-1)^{1/2}((c^2/\beta^2)-2)^2$--, In Column 19, Line 50, the equation "$C=4((c^2/\alpha'^2)-1)^{1/2}((c^2\alpha^2)-1)^{1/2}((c^2\beta^2)-1)^{1/2}$" should read --$C=4((c^2/\alpha'^2)-1)^{1/2}((c^2/\alpha^2)-1)^{1/2}((c^2/\beta^2)-1)^{1/2}$--,

UNITED STATES PATENT AND TRADEMARK OFFICE
CERTIFICATE OF CORRECTION

PATENT NO. : 4,979,150
DATED : December 18, 1990
INVENTOR(S) : Frederick J. Barr It is certified that error appears in the above-identified patent and that said Letters Patent is hereby corrected as shown below:

In Column 19, Line 55, the equation "$61.9° <= \alpha_p <= 90°$" should read --$61.9° <= \alpha_p' <= 90°$--, In Column 19, Line 63, the equation "$C=((c^2/\alpha'^2)-1)^{\frac{1}{2}}((c^2/\beta^2)^2$" should read --$C=((c^2/\alpha'^2)-1)^{\frac{1}{2}}((c^2/\beta^2)-2)^2$--, In Column 20, Line 26, the equation "$|c|>=\alpha'>=\alpha>=\beta ps 0<=\gamma_p'<=90°$" should read
--$|c|>=\alpha'>=\alpha>=\beta$
  $0<=\gamma_p'<=90°$ --, In Column 20, Line 41, after the final ), at the end of the equation, add "--...--", as set forth on Page 46, Line 34, of the Specification.

In Column 20, Line 50, the equation
"$s(t)=p(t)+(\rho'\alpha'/\cos\gamma_p')((1+K_R)/(1-K_R)v(t)$" should read
--$s(t)=p(t)+(\rho'\alpha'/\cos\gamma_p')((1+K_R)/(1-K_R)v(t)$--, as set forth on Page 47, Line 9, of the Specification.

In Column 21, Line 2, after the word "water" add therefore --;--, as set forth on Page 48, Line 2, of the Specification.

UNITED STATES PATENT AND TRADEMARK OFFICE
CERTIFICATE OF CORRECTION

PATENT NO. : 4,979,150

DATED : December 18, 1990

INVENTOR(S) : Frederick J. Barr

It is certified that error appears in the above-identified patent and that said Letters Patent is hereby corrected as shown below:

In Column 23, in Claim 6, Line 3, the word "whee" should read --where--,

In Column 25, Claim 25, Line 5, the word "legs" should read --lags--,

In Column 17, Line 52, the equation "$0 <= \gamma_s <= \sin^{-1}(\beta/\alpha') = 13.0°$" should read --$0 <= \gamma_s <= \sin^{-1}(\beta/\alpha') = 13.9°$--, In Column 12, Line 26, the equation "$z_d<d, v(t)$"
--$z_d<0, v(t)$--.

In Column 12, Line 30, the equation
"$s(t)=2T\delta(t-(z_d/\alpha'))-2RT\delta(t-((2d-z_d)/\alpha'))$" should read
--$s(t)=2T\delta(t-(z_d/\alpha'))-2RT\delta(t-((2d+z_d)/\alpha'))$--.

In Column 18, Line 18, the equation "$(o_1\zeta d)$"

In Column 18, Line 47, the equation "$\Delta t=(2d-2z_d/\alpha')\cos\gamma_p'$"
--$\Delta t=((2d-2z_d)/\alpha')\cos\gamma_p'$--.

UNITED STATES PATENT AND TRADEMARK OFFICE
CERTIFICATE OF CORRECTION

PATENT NO. : 4,979,150

DATED : December 18, 1990

INVENTOR(S) : Frederick J. Barr

It is certified that error appears in the above-identified patent and that said Letters Patent is hereby corrected as shown below:

In Column 18, Line 47, the equation "$\Delta t=(2d-2z_d/\alpha')\cos\gamma_p'$" should read --$\Delta t=((2d-2z_d)/\alpha')\cos\gamma_p'$--.

Signed and Sealed this

Second Day of March, 1993

Attest:

STEPHEN G. KUNIN

*Attesting Officer*     *Acting Commissioner of Patents and Trademarks*

REEXAMINATION CERTIFICATE (3319th)

United States Patent [19]
Barr

[11] B1 4,979,150
[45] Certificate Issued Sep. 9, 1997

[54] SYSTEM FOR ATTENUATION OF WATER-COLUMN REVERBERATIONS

[75] Inventor: Frederick J. Barr, Houston, Tex.

[73] Assignee: Western Atlas International, Inc., Houston, Tex.

Reexamination Request:
No. 90/004,359, Sep. 11, 1996

Reexamination Certificate for:
Patent No.: 4,979,150
Issued: Dec. 18, 1990
Appl. No.: 398,809
Filed: Aug. 25, 1989

Certificate of Correction issued Nov. 30, 1992.

Certificate of Correction issued Jan. 26, 1993.

[51] Int. Cl.⁶ ............................................. G01V 1/38
[52] U.S. Cl. .............................................. 367/24; 367/57
[58] Field of Search ................................ 367/21, 24, 46, 367/57

[56] References Cited

U.S. PATENT DOCUMENTS

| | | | |
|---|---|---|---|
| 3,350,683 | 10/1967 | Sengbush | 340/7 |
| 3,943,484 | 3/1976 | Balderson | 340/7 |
| 4,134,098 | 1/1979 | Ruehle | 340/7 |
| 4,146,870 | 3/1979 | Ruehle | 340/7 |
| 4,146,871 | 3/1979 | Ruehle | 340/7 |
| 4,234,938 | 11/1980 | Allen et al. | 367/24 |
| 4,242,740 | 12/1980 | Ruehle | 367/15 |
| 4,353,121 | 10/1982 | Ray et al. | 367/21 |
| 4,437,175 | 3/1984 | Berni | 367/24 |
| 4,467,459 | 8/1984 | Currie | 367/21 |
| 4,476,550 | 10/1984 | Ziolkowski et al. | 367/21 |
| 4,486,865 | 12/1984 | Ruehle | 367/24 |
| 4,520,467 | 5/1985 | Berni | 367/24 |
| 4,625,302 | 11/1986 | Clark | 367/24 |
| 4,644,508 | 2/1987 | Zachariadis | 367/24 |
| 4,682,307 | 7/1987 | Newman | 367/21 |
| 4,752,916 | 6/1988 | Loewenthal | 367/24 |
| 4,780,856 | 10/1988 | Becquey | 367/23 |
| 4,843,597 | 6/1989 | Gjessing et al. | 367/15 |
| 4,887,243 | 12/1989 | Pann | 367/24 |
| 5,095,466 | 3/1992 | Julien et al. | 367/24 |

FOREIGN PATENT DOCUMENTS

| | | | |
|---|---|---|---|
| 0 089 700 | 9/1983 | European Pat. Off. | 1/38 |
| 2 360 087 | 2/1978 | France . | |
| 2 379 824 | 9/1978 | France | 1/38 |
| 2 489 530 | 3/1982 | France | 1/38 |
| 2 589 587 | 5/1987 | France | 1/38 |
| 2 653 900 | 5/1991 | France | 1/36 |

(List continued on next page.)

OTHER PUBLICATIONS

White, J.E., *Seismic Waves—Radiation, Transmission, and Attenuation*, Chapter 2—Plane Waves, McGraw-Hill, 1965.

Sanders, J.L., "Seismic Opens Shallow Play", *Offshore*, vol. 47, No. 7, Jul., 1987, pp. 36–39.

Adair, R.G. et. al., "Infrasonic Seismic and Acoustic Measurements in the Deep Ocean", *IEEE Journal of Oceanic Engineering*, vol. 13, No. 4, Oct., 1988, pp. 245–253.

*Primary Examiner*—Ian J. Lobo

[57] ABSTRACT

A marine seismic reflection prospecting system reduces coherent noise by applying a scale factor to the output of a pressure transducer and a particle velocity transducer positioned substantially adjacent one another in the water. The transducers can be positioned at a point in the water above the bottom and, thereby, eliminate downgoing components of reverberation, or they can be positioned on the water's bottom and, thereby, eliminate both upgoing and downgoing components of the reverberation. The scale factor, which derives from the acoustical impedance of the water or water-bottom material, can be determined both deterministically and statistically. The former involves measuring and comparing the responses of the pressure and velocity transducers to a pressure wave induced in the water. The latter involves comparing the magnitude of the pressure signal autocorrelation to the pressure and velocity signal crosscorrelation at selected lag values or, alternatively, comparing the magnitude of the pressure signal autocorrelation to the velocity signal autocorrelation at selected lag values.

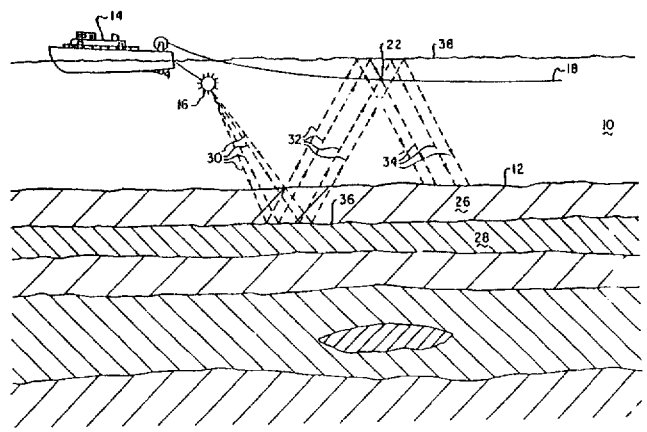

FOREIGN PATENT DOCUMENTS

| | | | |
|---|---|---|---|
| 146924 | 9/1982 | Norway | 1/38 |
| 149978 | 4/1984 | Norway . | |
| 157277 | 11/1987 | Norway | 1/38 |
| 164138 | 5/1990 | Norway | 1/38 |
| 169985 | 5/1992 | Norway | 1/36 |
| 811177 | 3/1981 | U.S.S.R. | 1/38 |
| 934410 | 6/1982 | U.S.S.R. | 1/38 |
| 949589 | 8/1982 | U.S.S.R. | 1/38 |
| 1163288 | 6/1985 | U.S.S.R. . | |
| 1481698 | 5/1989 | U.S.S.R. . | |
| 1 583 042 | 1/1981 | United Kingdom | 1/38 |
| 1 598 611 | 9/1981 | United Kingdom | 1/38 |
| 2 081 446 | 2/1982 | United Kingdom | 1/38 |
| 2 083 221 | 3/1982 | United Kingdom | 1/20 |
| WO 82/00365 | 2/1982 | WIPO | 1/36 |

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 11, 12, 16 and 17 are cancelled.

Claims 1, 3, 4, 9, 10, 13, 18, 19, 26, 30, 31 and 36 are determined to be patentable as amended.

Claims 5–8, 14, 15, 20–25, 27–29, 32–35 and 37–40, dependent on an amended claim, are determined to be patentable.

New claims 41–51 are added and determined to be patentable.

1. An improved seismic reflection method for geophysical prospecting in water covered areas, comprising the steps of:
   A. generating a seismic wave for reflection from earth strata,
   B. detecting water pressure at a first position in the water resulting from said seismic wave and generating a signal representative thereof,
   C. detecting water velocity at a position substantially near said first position resulting from said seismic wave and generating a signal representative thereof, and
   D. generating an enhanced seismic reflection signal by multiplying at least one of said water pressure-representative signal and the water velocity-representative signal by a scale factor dependent upon an acoustical impedance of [a substance through which said seismic wave travels] *the water*, and by summing said scaled water velocity-representative and water pressure-representative signals, and enhanced seismic reflection signal being substantially free of at least downwardly-propagating components of reverberation of said seismic wave within the water.

3. A method according to claim [2] *42*, wherein said scaling step includes the step of multiplying said at least one selected signal by a value dependent upon $$\rho'\alpha'/Dir_{corr}$$

where $\rho'$ is a density of the water, $\alpha'$ is a velocity of propagation of the seismic wave in the water, and $Dir_{corr}$ is a directivity correction factor.

4. A method according to claim 3, wherein said scaling step includes the step of multiplying said at least one selected signal by a value dependent upon $$(\rho'\alpha'/Dir_{corr})*(G_p/G_v)$$

where $G_p$ is a transduction constant associated with the water pressure detecting step, and $G_v$ is a transduction constant associated with the water velocity detecting step.

9. A method according to claim [2] *42*, wherein said scaling step includes the step of multiplying said water velocity-representative signal by $$(G_p/G_v)*\rho'\alpha'.$$

10. A method according to claim 1, comprising the step of positioning a pressure detector and a velocity detector [substantially near water's bottom] for detecting said water pressure and said water velocity *substantially near water's bottom* and for generating signals representative thereof, respectively.

13. A method according to claim [12] *44*, wherein said scaling step includes the step of multiplying said at least one selected signal by a value dependent upon $$(\rho\alpha/Dir_{corr})*(G_p/G_v)$$

where $G_p$ is a transduction constant associated with the water pressure detecting step, and $G_v$ is a transduction constant associated with the water velocity detecting step.

18. A method according to claim [11] *19*, wherein said scaling step includes the step of multiplying said water velocity-representative signal by $$(G_p/G_v)*\rho\alpha.$$

19. A method according to claim [11, including the step of] *43, wherein the step of determining a scale factor comprises* determining said scale factor statistically.

26. A method according to claim [11, including the step of] *43, wherein the step of determining a scale factor comprises* determining said scale factor deterministically.

30. A method according to claim [11] *43*, including the step *of* determining said scale factor by iteratively performing said scaling and summing steps with one or more candidate scale factors, stacking the resultant enhanced seismic reflection signals and determining said scale factor to be a candidate which minimizes the effect of water column reverberations.

31. An improved seismic reflection method for geophysical prospecting in water covered areas,
   said method being free of filter means including a deconvolution operation for changing the frequency content of any one of pressure-detecting and velocity-detecting elements, said method comprising the steps of
   A. generating a seismic wave for reflection from earth strata,
   B. positioning a pressure detector and a velocity detector substantially near water's bottom for detecting said water pressure and said water velocity and for generating signals representative thereof,
   C. detecting water velocity at a position substantially near the position of said pressure detector resulting from said seismic wave and generating a signal representative thereof, and
   D. generating an enhanced seismic reflection signal as a selected linear combination of said water pressure-representative signal and the water velocity-representative signal, said enhanced seismic reflection signal being substantially free of at least downwardly-propagating components of reverberation of said seismic wave within the water, said enhanced seismic reflection signal-generating step includes the steps of

3 i. *determining a scale factor dependent upon an acoustical impedance of a solid earth material at said water's bottom,*
ii. scaling said water velocity-representative and water pressure-representative signals by multiplying at least a selected one of them by [a] *said* scale factor[dependent upon an acoustical impedance of a solid earth material at said water's bottom],
[ii] iii. summing said scaled water velocity-representative and water pressure-representative signals to produce said enhanced seismic reflection signal, said enhanced seismic reflection signal being substantially free of downwardly-propagating and upwardly-propagating components of reverberation of said seismic wave within the water.

36. An improved system for seismic reflection prospecting in water covered areas, said system being free of filter means including a deconvolution operation for changing the frequency content of any one of pressure-detecting and velocity-detecting elements, said system comprising
A. means for generating a seismic wave for reflection from earth strata,
B. Pressure detection means disposed substantially near a bottom of said water for detecting a pressure associated with a resultant seismic wave and for generating signals representative thereof,
C. particle velocity detection means disposed at a position substantially near said pressure detection means for detecting a particle velocity associated with said resultant seismic wave and generating a signal representative thereof, and
D. enhanced seismic reflection means coupled with said pressure detection means and said particle velocity detection means for generating an enhanced seismic reflection signal as a selected linear combination of said water pressure-representative signal and the water velocity-representative signal, said enhanced seismic reflection signal being substantially free of at least downwardly-propagating components of reverberation of said seismic wave within the water, said enhanced seismic reflection means including
i. *means for determining a scale factor dependent upon an acoustical impedance of a solid earth material at said water's bottom,*
ii. means for multiplying at least a selected one of said pressure-representative and water velocity-representative signals by [a] *said* scale factor[dependent upon an acoustical impedance of a solid earth material at said water's bottom],
ii. means for summing said scaled water velocity-representative and water pressure-representative signals to produce said enhanced seismic reflection signal, said enhanced seismic reflection signal being substantially free of downwardly-propagating and upwardly-propagating components of reverberation of said seismic wave within the water.

41. An improved seismic reflection method for geophysical prospecting in water covered areas, comprising the steps of:

A. generating a seismic wave for reflection from earth strata,
B. detecting water pressure at a first position in the water resulting from said seismic wave and generating a signal representative thereof,

4

C. detecting water velocity at a position substantially near said first position resulting from said seismic wave and generating a signal representative thereof,
D. determining a scale factor dependent upon an acoustical impedance of a substance through which said seismic wave travels and
E. generating an enhanced seismic reflection signal by multiplying at least one of said water pressure-representative signal and the water velocity-representative signal by said scale factor, and by summing said scaled water velocity-representative and water pressure-representative signals, and enhanced seismic reflection signal being substantially free of at least downwardly-propagating components of reverberation of said seismic wave within the water.

42. A method according to claim 1, further including the step of determining a scale factor dependent upon an acoustical impedance of the water.

43. A method according to claim 41, wherein said enhanced seismic reflection signal-generating step includes the steps of A. scaling said water velocity-representative and water pressure-representative signals by multiplying at least a selected one of them by a scale factor dependent upon an acoustical impedance of a solid earth material at said water's bottom, and
B. summing said scaled water velocity-representative and water pressure-representative signals to produce said enhance seismic reflection signal, said enhance seismic reflection signal being substantially free of downwardly-propagating and upwardly-propagating components of reverberation of said seismic wave within the water.

44. A method according to claim 19, wherein said scaling step includes the further step of multiplying said at least one selected signal by a value dependent upon $$\rho\alpha Dir_{corr}$$

where $\rho$ is a density of said solid earth material, $\alpha$ is a velocity of propagation of the seismic wave in said solid earth material, and $Dir_{corr}$ is a directivity correction factor.

45. A method according to claim 44, wherein said scaling step includes the step of determining said directivity correction factor, $Dir_{corr}$ to be equal to one.

46. A method according to claim 26, wherein said scaling step includes the further step of multiplying said at least one selected signal by a value dependent upon $$\rho\alpha/dir_{corr}$$

where $\rho$ is a density of said solid earth material, $\alpha$ is a velocity of propagation of the seismic wave in said solid earth material, and $Dir_{corr}$ is a directivity correction factor.

47. A method according to claim 46, wherein said scaling step includes the step of multiplying said at least one selected signal by a value dependent upon $$(\rho\alpha Dir_{corr})i^*(G_p/G_v)$$

where $G_p$ is a transduction constant associated with the water pressure detecting step, and $G_v$ is a transduction constant associated with the water velocity detecting step.

48. A method according to claim 47, wherein said scaling step includes the step of generating said directivity correction factor, $Dir_{corr}$, to be equal to $\cos(\gamma_p')$, for $\gamma_p'$ less than a selected critical angle, and to otherwise be equal to 1, where $\gamma_p'$ is an angle of propagation from vertical of the seismic wave in the water.

49. A method according to claim 48, wherein said scaling step includes the step of determining said critical angle to be substantially equal to $\arcsin(\alpha'/\alpha)$, where $\alpha$ is the velocity of propagation of the seismic wave in the water and $\alpha$ is a velocity of propagation of the seismic wave in an earth material at said water's bottom.

50. A method according to claim 46, wherein said scaling step includes the step of determining said directivity correction factor, $Dir_{corr}$, to be equal to one.

51. A method according to claim 26, wherein said scaling step includes the step of multiplying said water velocity-representative signal by $$(G_p/G_v)*\rho\alpha.$$

* * * * *